(12) United States Patent
Sotomayor

(10) Patent No.: US 9,767,485 B2
(45) Date of Patent: Sep. 19, 2017

(54) SYSTEM AND METHOD FOR PROVIDING RELEVANT USER NOTIFICATIONS

(71) Applicant: Leonard Z Sotomayor, New York, NY (US)

(72) Inventor: Leonard Z Sotomayor, New York, NY (US)

( * ) Notice: Subject to any disclaimer, the term of this patent is extended or adjusted under 35 U.S.C. 154(b) by 0 days.

(21) Appl. No.: 13/999,673

(22) Filed: Mar. 17, 2014

(65) Prior Publication Data

US 2015/0019338 A1 Jan. 15, 2015

Related U.S. Application Data

(60) Provisional application No. 61/852,078, filed on Mar. 15, 2013.

(51) Int. Cl.
*G06Q 30/00* (2012.01)
*G06Q 30/02* (2012.01)

(52) U.S. Cl.
CPC ..... *G06Q 30/0261* (2013.01); *G06Q 30/0257* (2013.01); *G06Q 30/0269* (2013.01); *G06Q 30/0275* (2013.01)

(58) Field of Classification Search
CPC .......................... G06Q 30/0257; G06Q 30/0261
See application file for complete search history.

(56) References Cited

U.S. PATENT DOCUMENTS

| | | | |
|---|---|---|---|
| 5,974,398 A | 10/1999 | Hanson et al. | |
| 6,269,361 B1 | 7/2001 | Davis et al. | |
| 6,321,158 B1 * | 11/2001 | DeLorme | G01C 21/26 340/995.16 |
| 6,324,519 B1 | 11/2001 | Eldering | |
| 7,636,574 B2 | 12/2009 | Poosala | |
| 8,099,109 B2 | 1/2012 | Altman et al. | |
| 8,296,184 B2 | 10/2012 | Ramer et al. | |
| 2002/0046051 A1 * | 4/2002 | Katzman | G06Q 30/02 705/26.1 |
| 2002/0091569 A1 * | 7/2002 | Kitaura | G06Q 30/02 705/14.26 |
| 2007/0127650 A1 * | 6/2007 | Altberg et al. | 379/114.13 |
| 2007/0130005 A1 | 6/2007 | Jaschke | |
| 2007/0165904 A1 * | 7/2007 | Nudd et al. | 382/100 |
| 2008/0153513 A1 | 6/2008 | Flake et al. | |

(Continued)

*Primary Examiner* — Bennett Sigmond
*Assistant Examiner* — Scott C Anderson
(74) *Attorney, Agent, or Firm* — Brian K. Johnson, Esq., LLC

(57) ABSTRACT

An apparatus and method are disclosed for providing an advertising system in which a buyer generates a profile containing a list of preferred purchases or vendors. At least some of the buyer's preferred profile entries are associated with a geographic area. A mobile network is used to connect the mobile buyers and the sellers. Both the buyers' profiles and the sellers' advertisements are uploaded to the network. The network matches buyers and sellers by providing to the buyers sales advertisements that match the criteria of the uploaded buyer's profiles but without sharing buyers' unique identifying information with the sellers. The buyer devices optionally include an ad server to filter and manage the buyer's receipt of advertisements. The sellers' offers and promotions also optionally include time-dependent information such that they expire upon the passage of a specified time period.

18 Claims, 20 Drawing Sheets

(56) References Cited

U.S. PATENT DOCUMENTS

| | | |
|---|---|---|
| 2009/0247193 A1 | 10/2009 | Kalavade |
| 2010/0004997 A1 | 1/2010 | Mehta et al. |
| 2010/0138294 A1 | 6/2010 | Bussmann et al. |
| 2010/0151821 A1 | 6/2010 | Sweeney et al. |
| 2011/0295687 A1 | 12/2011 | Bilenko et al. |
| 2012/0047011 A1* | 2/2012 | Rippetoe et al. .......... 705/14.45 |
| 2012/0130806 A1 | 5/2012 | Partridge et al. |
| 2012/0149396 A1 | 6/2012 | Fan et al. |

* cited by examiner

| | | | | | | | | |
|---|---|---|---|---|---|---|---|---|
| Seller ID | SMB3 | | | | | | | |
| Ad content data | Product 1C | | | | | | | |
| SELLER CATEGORY | 5 | | | | | | | |
| | | WEIGHTED SELLER GEO-REFERENCE RADIUS | | | | | | |
| | Max Ads | Rank | Time close of bidding | Ad Code T, I, DO, A, V | Time Code D, W, M, H, R | Winning Bid (000's) | # users simple geo-centric associations | Winning Bid (000's) | # user without simple geo-centric associations | Population Aggregate |
| Seller Current Measurement | | | | | | | 1,900 | | 28,000 | 139,000 |
| Parsing Command | | | | | | | | | | |
| Default List | 4 | 1 | 2 hr 45 min | DO | W | | | $12.00 | | |
| Association within user geo-reference point | | | | | | | | | | |
| User parsing seller category association | | | | | | | | | | |
| User parsing product association | 4 | 4 | 2 hr 45 min | DO | W | | | $10.00 | | |
| User parsing event association | | | | | | | | | | |
| Premium reserved inventory placement | | | | | | | | | | |
| Distance to user geo-reference point | | | | | | | | | | |
| Pp-UP list | | | | | | | | | | |
| Parsing Command(n) | | | | | | | | | | |

FIG. 13

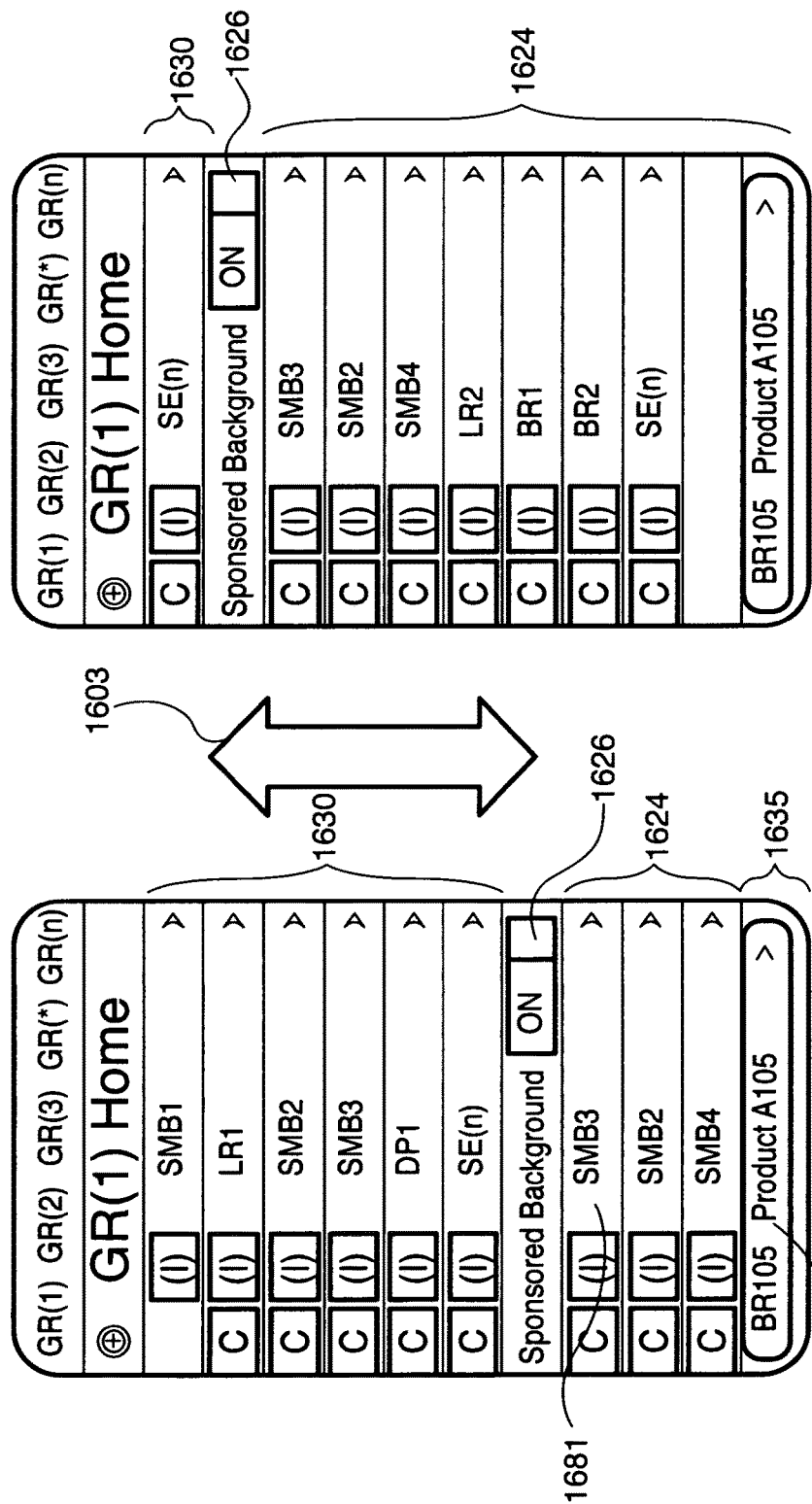

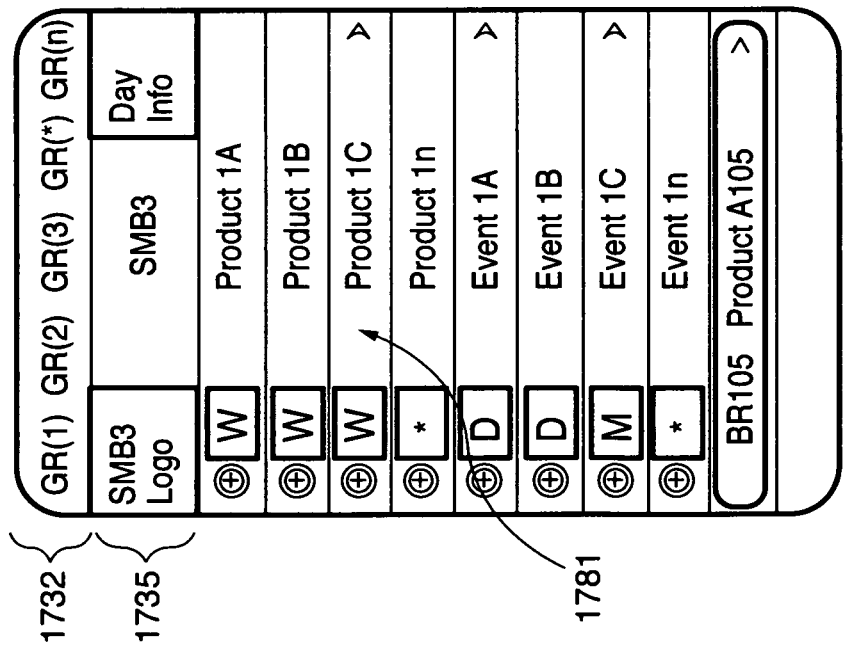
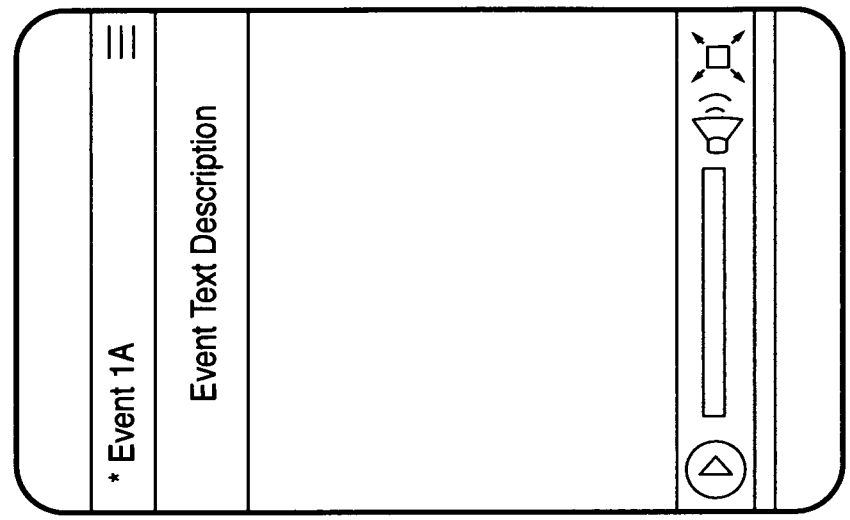
FIG. 18A
FIG. 18B

SYSTEM AND METHOD FOR PROVIDING RELEVANT USER NOTIFICATIONS

CROSS REFERENCE TO RELATED APPLICATIONS

This application claims priority to and the benefit of U.S. Provisional Patent Application No. 61/852,078 filed on Mar. 15, 2014 titled "Systems and method for enabling privacy of mobile device users and enabling relevant mobile advertising . . . " the entire contents of which are incorporated by reference herein in their entirety.

STATEMENT REGARDING FEDERALLY SPONSORED RESEARCH OR DEVELOPMENT

Not applicable.

BACKGROUND OF THE INVENTION

Field of the Invention

Privacy concerns regarding mobile device data have recent emerged in national discussions regarding individuals' always-on, internet-connected world. Mobile device users increasingly desire more control over their own user information; information which may be personal in nature, such as location-based information captured by mobile applications and shared with third-parties. Many mobile device users do not know exactly what information is being collected, what information is being shared, and how the information is being used. Location information of mobile devices is conventionally captured directly from the device, for example, from the GPS tracking applications, the mobile device's managed connections to cellular towers, GPS satellite tracking sites, or reverse internet protocol (IP) address look-up services. In each of these inadvertent connections, personal information is being accessed on the users' mobile devices including possibly phone contact information, mobile web browsing history, IP addresses visited, and mobile device identifying numbers, to name just a few. Several recent high profile examples of a mobile application mishandling a mobile device user's personal data have had a negative impact on consumer trust. Advertisers and promoters are utilizing and exploiting ever increasing collections of mobile device user data in an attempt to create location-based advertising for mobile customers.

Apart from the mobile data collection problem, the actual display of mobile advertising has itself become a nuisance to mobile device users. Various mobile device display methodologies are now used to attract the mobile users' attention in this regard, such as banner display advertising and push notification windows (similar to pop up windows on a desktop computing device). In most instances, mobile advertisements are neither relevant to the mobile device user nor are they desired or solicited by the user. As a further complication, the smaller mobile device displays easily become crowded when random asynchronous information is constantly presented to and displayed on the mobile device. Consequently, conventional advertising networks used for mobile ad delivery suffer from at least three shortcomings: 1) they carry a high nuisance factor in delivering useful ads; 2) they compromise the privacy of the mobile device user in exchange for the display of those advertisements; and 3) they potentially create negative user impressions based on these problems.

Description of the Prior Art

Many advertising systems presently rely on tracking a user and collecting the user's mobile device information on a centralized ad server. This information is then sorted and analyzed to deliver targeted advertisements to the user. U.S. Patent Appln. Pub. No. US 2010/0138294 A1, to Bussmann, et al. and published on Jun. 3, 2010 (hereinafter Bussmann, et al.), discloses one such system. In Bussmann, et al., a location-based advertising server is used to collect ad content from advertising publishers associated with a particular geographic region. (Abstract.) The system of Bussmann, et al. then collects bids for placing that content along with requests from mobile devices within the specified geographic area for delivering advertising content. The advertising system of Bussmann, et al. matches device request for ad content associated with the geographic area and delivers ad content based on bid prices offered by the advertisers.

The system of Bussmann, et al. provides the mobile device user with no direct control over the ad content received except as to its geographic proximity to the user. A better functioning system would permit a mobile device user's advertising needs to be directly presented to an ad server which then requests, specific, tailored ads from the advertisers. What is desired, on the part of both the buyer and seller, is a push dynamic in creating a type of "specific channel relationship" between them. This "channel relationship" is solidified when the above-mentioned privacy concerns are addressed. Just as in the purely physical shopping world, the best buying experiences are obtained when highly relevant delivery of ad content and offerings are presented to the user at precisely the moment in time in which the user is most engaged with the shopping, planning and decision-making processes.

U.S. Pat. Appln. Pub. No. US 2011/0295687 A1, to Bilenko, et al. and published on Dec. 1, 2011 (hereinafter Bilenko, et al.) discloses a system in which user profiles are introduced for tailoring delivered ad content. (Abstract.) In Bilenko, et al., the user profile is used as a factor in selecting ads to be forwarded to the user. (Abstract.) However, the system disclosed in Bilenko, et al. allows user profiles and past purchase histories unique to the users to be shared with the ad content providers, thereby violating the privacy concerns that are the subject of the present invention. (Bilenko, et al., p. 4, para. [0023].)

U.S. Pat. Appln. Pub. No. US 2007/0130005 A1, to Jaschke and published on Jun. 7, 2007 (hereinafter Jaschke), is similarly deficient in collecting and using the personal information of the user in the advertising bidding process. Specifically, highly personal data is collected by the advertising server including age, gender, ethnic group, income, etc. (See FIG. 3 and related description.) The consumer information broker of Jaschke then filters the user profile information and correlates this private user data with a target profile created by the advertiser to determine a winning bidder. (Jaschke, p. 4, paras. [0059] and [0067].) While the advertiser never "sees" or receives the user's personal information as part of the ad selection process, that information is used, nonetheless, by the system of Jaschke to initially screen and match mobile users having profiles containing sensitive information with the advertisers' target profiles. Further, while Jaschke discloses that users may opt-out of this targeted profile bidding process, (Jaschke, p. 6, para. [0080]), that information is nonetheless collected and stored on the advertiser's ad server as part of the overall system operation.

Other inventions have managed some aspects of an anonymous profile, but without consideration of mobile users' specific requested content. U.S. Pat. Appln. Pub. No.

US 2009/0247193 A1, to Kalavade and published on Oct. 1, 2009, is one such invention. (See Abstract.) The patent application of Kalavade discloses a detailed process for the real-time creation of an anonymous user profile. (Kalavade, FIG. 1 and p. 3, paras. [0067]-[0076].) However, only when the users opt out of personal information sharing is the profile kept confidential. (Kalavade, p. 3, para. [0072]). The data processing of Kalvade, however, all this takes place with respect to user data collected in real-time but without any consideration of the specific ads that the mobile user is interested in receiving, and particularly without any connection to user-specified geographic areas of advertising interest.

Thus it is an object of this invention, and a failure of the prior art to-date, to deliver user-specified advertising content to the mobile device of those users such that the ad content 1) satisfies a user request or specification for the ad; 2) is provided within a geographical area in which the user is interested in shopping, and 3) is provide in a manner that adequately preserves the privacy of the user's mobile device data.

BRIEF SUMMARY OF THE INVENTION

In one particularly preferred embodiment, a system is provided for delivering notifications to user devices including: at least one user device having a processor and an associated memory for storing instructions executed by the processor, the user device storing in the memory a user profile generated by a user of the user device, the user profile containing a list of preferred offerings of the user, the preferred offerings related a geographic area, the geographic area is determined by the user of the user device; and a computer-based vendor system having a processor and an associated memory for storing instructions executed by the processor, the vendor system coupled to the at least one user device and at least one vendor through a computer network, the user profile uploaded to and stored on the network, the user profile is stored confidentially with respect to the at least one vendor, the at least one vendor providing a vendor notification to the vendor system, the vendor system uploading the vendor notification to the network, the network determining that the preferred offerings of the user matches the vendor notification, and generating a user notification containing data from the vendor notification, and transmitting the user notification to the user device using the network.

In particularly preferred aspects of the invention, the preferred offerings include a vendor within the geographic area and the vendor notification includes a vendor identifier, the vendor system determines a match when the user profile of the at least one notified user device includes the vendor identifier; the preferred offerings include a product within the active geographic area and the vendor notification includes a product identifier, the vendor system determines a match when the user profile of the at least one notified user devices include the product identifier; the vendor notification is one of an advertisement, a circular, a promotion, an event, a destination place or a brand. In other aspects of the invention, the user device includes an ad server coupled to the processor and associated memory, the ad server filters the user notifications so as to display only those user notifications that match the preferred offerings, the ad server includes a bypass feature that is capable of being activated so that user notifications that do not match the preferred offerings are also displayed on user device; the vendor notification includes an expiration period and the associated user notification indicates to the user when the vendor notification has expired; the user profile stored on the network is periodically updated; the user device is a mobile device, including but not limited to: a handheld electronic device, a tablet, a smart phone, a mobile phone, a phablet, a laptop, or a notebook computer; the active geographic area is determined by the user to include a local geographic area that includes either a user's home or a user's employment location; or the user profile has a default configuration by which the at least one user device receives user notifications, the default configuration is customizable and includes a discovery mode selection for receiving user notifications that do not match any criteria within the user profile.

In a particularly preferred method of the present invention, the system that implements the method delivers notifications to at least one user from at least one vendor, the method is operated over a computer network that couples a vendor system associated with at least one vendor and at least one user device associated with a user, the at least one user device and the vendor system includes a processor and an associated memory for storing instructions executed by the processors, a computer network is coupled to the at least one user device and the vendor system, a user profile contains a list of preferred offerings, the list of preferred offerings created by the at least one user and associated with a geographic area, the geographic area is determined by the user of the at least one user device, the method includes the steps of: receiving the list of preferred offerings at the network from the at least on user; receiving a vendor notification at the network from the at least one vendor; determining within the network a match between the preferred offerings and the vendor notification; and transmitting a user notification containing data from the vendor notification from the network to the to the at least one user device.

In certain preferred aspects of the method, the method is repetitively: creating the user profile by the user; transmitting the user profile to the network; updating the user profile by the user; and transmitting the updated user profile to the network; or creating a vendor profile from the at least one vendor on the network; uploading a list of vendor data to the network for inclusion in the vendor profile; and transmitting with the network the list of vendor data to the at least one user device with the user notification; or transmitting anonymous user data to the at least one vendor. In still other aspects of the method, the vendor notification includes an expiration period and the method further includes sending an additional user notification indicating to the at least one user when the vendor notification expires; or the method includes scheduling the transmission of the user notification for a certain time and transmitting the user notification at the time; or the at least one user device includes an ad server coupled to the processor and the associated memory, and the method includes: filtering the user notifications with the ad server so as to display only those user notifications that match the preferred offerings; activating a bypass feature on the ad server; and displaying on the at least one user device user notifications that do not match the preferred offerings.

In a particularly preferred business method for delivering non-solicited notifications to at least one user from at least one vendor, the present invention includes a computer network that couples a vendor system, a plurality of vendors and at least one user device associated with a user, the at least one user device and the vendor system including a processor and an associated memory for storing instructions executed by the processors, a user profile containing a list of preferred offerings, the list of preferred offerings created by the user and associated with a geographic area, the geographic area is determined by the user of the at least one user device, the user profile further includes a discovery mode preference, the business method includes receiving a plurality of vendor notifications at the network from the plurality of vendors; receiving monetary bids from the plurality of vendors for distributing the notification; selecting a vendor from the plurality of distributing vendors based on the bid of the distributing vendor; receiving payment at the network corresponding to the monetary bid at the vendor system; determining that the discovery mode preference is set for a group of users devices; and transmitting a user notification containing data from the selected distributed vendor and associated vendor notification from the vendor system to the to the group of user devices for which the discovery mode is set. In addition the business method may include transmitting user summary profile data to the plurality of vendors, the vendors using the user summary profile data in determining the value of the monetary bids.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 13 shows a data diagram illustrating data elements used by the seller bidding panel according to one particularly preferred embodiment of the invention;

FIGS. 17A and 17B show a pair of mobile device displays illustrating a sequence of consecutive actions taken by the user according to one particularly preferred embodiment of the invention;

FIGS. 18A and B show another pair of mobile device displays illustrating a sequence of consecutive actions taken by the user according to one particularly preferred embodiment of the invention;

DETAILED DESCRIPTION OF THE INVENTION

To facilitate a clear understanding of the present invention, illustrative examples are provided herein which describe certain aspects of the invention. However, it is to be appreciated that these illustrations are not meant to limit the scope of the invention, and are provided herein to illustrate certain concepts associated with the invention.

It is also to be understood that certain aspects of the present invention may be implemented in various forms of hardware, software, firmware, special purpose processors, or a combination thereof. Preferably, certain aspects of the present invention may be implemented in software as a program tangibly embodied on a program storage device. The program may be uploaded to, and executed by, an electronic machine comprising any suitable architecture. Preferably, certain aspects of the invention are implemented on a computer platform having hardware such as one or more central processing units (CPU), a random access memory (RAM), and input/output (I/O) interface(s). The computer platform may also include an operating system and microinstruction code. The various processes and functions described herein may either be part of the microinstruction code or part of the program (or combination thereof) which is executed via the operating system. In addition, various other peripheral devices may be connected to the computer platform such as an additional data storage device and a printing device.

It is to be understood that, because some of the constituent system components and method steps depicted in the accompanying figures are preferably implemented in software, the actual connections between the system components (or the process steps) may differ depending upon the manner in which the present invention is programmed. Specifically, any of the computers or devices may be interconnected using any existing or later-discovered networking technology and may also all be connected through a lager network system, such as a corporate network, metropolitan network or a global network, such as the internet.

Figure 1:
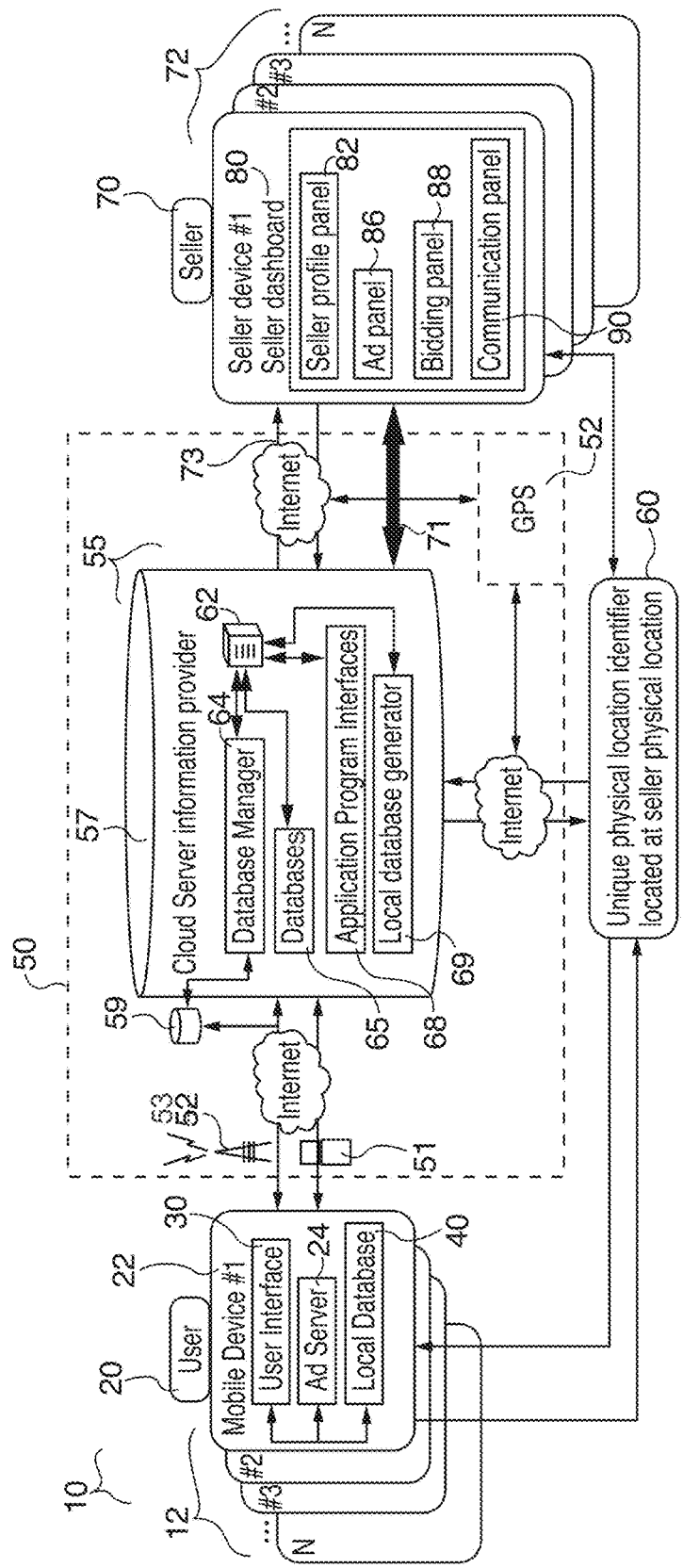
FIG. 1 is an overall system network diagram illustrating various aspects of one particularly preferred embodiment of the invention.

FIG. 1 shows a block diagram of the overall mobile purchasing system 10 of the present invention. System 10 includes a plurality of computer systems, mobile devices and mobile information networks. Mobile network 50 is provided as the central information conduit that connects mobile users having a plurality of mobile devices 12 to sellers (alternatively vendors) having a plurality of sales promotion devices 72. A GPS or location determining network 52 is included as an additional mobile network component within mobile network 50 and is also connected to the plurality of user mobile devices 12 and to the plurality of sales promotion devices 72. Physical location devices 60 are electronic devices that are connected to the mobile network 50 and are sited at a particular geographic location. Physical location devices 60 are capable of wirelessly transmitting certain information to the mobile devices 12 when those devices are within an appropriate range of the physical location device and are typically associated with a non-mobile seller.

It should be noted that while the specific examples provided herein are primarily directed to mobile devices operating within a mobile network, the general concepts of the system disclosed in this invention may be equally applied to any non-mobile devices connected to an associated network and where the associated network possesses similar system architectures and functional capabilities. Further, the actual mobile connections illustrated herein may be any one of, or combination of, known or later-developed mobile access technologies, including by not limited to: cellular mobile, Wi-Fi, PAN, RFID, Bluetooth, NFC, radio, IR, and satellite. Finally, as used herein, the term "mobile network" 50 is used to denote the sum of the wireless access devices and the entire network to which they provide wireless access. That means that the "mobile network" is the entire network found behind and including the sum of wireless access points and to which a mobile device may connect using any of the supported communications protocols. In this regard, the wireless network includes wireless and wired devices behind the wireless access cloud. The "mobile network" may be proprietary, a public cloud network or it may be considered to include the entire web or internet. In sum, the mobile network is the totality of all networked devices for which wireless access is permitted such that any mobile device may be provided access to public portions or user specific portions of the interconnected devices comprising both the wired and mobile portions of the network.

Mobile device 22 is employed by a user or buyer 20 (used interchangeably) to perform any of the numerous and varied functions that mobile devices are capable of performing. By way of example and not limitation, mobile device 22 may be a smart phone, a tablet, wireless access device, fob, a portable or non-portable personal computer, or a smart television. Mobile device 22 is connected to the mobile network 50 in one of two ways. It may be connected directly, by cellular or satellite connection offered by a telecommunications or broadband information provider, for example, typically through the use of large and powerful network antenna structures 53. Alternatively, mobile device 12 may be connected indirectly to the mobile network through a wireless access gateways or wireless broadband modems 51 that, in turn connect to the internet through other wired and wireless connections. User 20 is capable of employing its mobile device 22 in any manner desirable and typical, for example, to use the mobile network to conduct telecommunications (e.g. making telephone calls), consume information content (e.g. streaming video, reading news articles) or conduct commerce (e.g. view advertisements, place orders).

The prototypical mobile device 22 is a "smart phone," a small handheld mobile computer that is capable of performing telecommunications functions. The mobile computer typically includes at least one processor and associated memory in which stored programs reside and from which the processor executes the program steps for those programs to effect the operations performed by the mobile device. The software on the mobile device may take the form of either stand-alone software that executes solely on the mobile device or in the form of small program software application components (apps or applets). In either case, data on which the standalone programs or apps operate may be provided by any of a number of sources, such as being input by the user 20, generated from within the mobile device (e.g. via numerical computations) or provided to the mobile device 22 over the wireless connection to that device by other devices within the mobile network. Most relevant to the present invention, mobile device 22 contains a stored program, preferably an app, to create and manage consumer purchase decisions according to the preferred embodiments of the invention. In either stand-alone or app software configurations, the stored program for managing these consumer purchases is programmable, configurable and otherwise capable of being controlled by the user.

To accomplish the consumer management function, mobile device 22 includes a user interface (UI) 30, an ad server 24 and a local database 40. As described in more detail below user 20 accesses mobile device 22 through the UI 30. The consumer's purchase data itself is stored on the local database 40 and is provided by any of a number of sources including user 20, the mobile device 22 itself and sources from with the mobile network. Ad server 24 exercises programmed control over the local database 40 under the direction of the user interface 30. Further, the ad server coordinates and executes most all of the user data management functions in relation to the display and management of the advertisements received by the user as described in more detail below.

In relevant aspects, mobile network 50 may include information or internet service providers (ISPs) 55 that operate a cloud 57 in the form of cloud servers 62, external cloud storage 59 and other associated apparatus. Specifically, database manager 64 may be part of the hardware and software operating on cloud server 62 to control the internal cloud storage on one or more databases 65. Application program interfaces 68 are provided for various external software developers to plug into the cloud software and access the cloud data. A local database generator 69 is coupled to the cloud servers and to the mobile devices and their local databases outside the mobile network. The local database generator serves to provide independent access to and management of the data on the user devices and interacts directly with the user devices' local databases so to update the information therein. As a complementary component to the plurality of users and their mobile devices 22, the mobile system 10 includes a plurality of sales promotion devices 72, each associated with a seller 70. Like the mobile devices 22, the sales promotion devices 72 include a computer that may, optionally, be capable of performing telecommunications functions. The computer within the sales promotion device typically includes at least one processor and associated memory in which stored programs reside and from which the processor executes the program steps of those programs to effect the operations performed by the sales promotion device. The software on the seller dashboard device may take the form of either stand-alone software that executes solely on the sales promotion device or in the form of small program software application components (apps or applets). In either case, data on which the standalone programs or apps operate may be provided by any of a number of sources, such as being input by the seller 70, generated from within the sales promotion device (e.g. via numerical computations) or provided to the sale promotion device 72 over the wired connection 73 or wireless connection 71 that provides network connectivity to the sales promotion devices 72. Most relevant to the present invention, sales promotion device 72 contains a seller dashboard 80 consisting essentially of a computer display coded in software on the sales promotion device. The display provides certain user interfaces, such as a seller profile panel 82, and ad panel 86 a bidding panel 88 and a communications panel 90. Each of these panels or displays is coded in software as a stored program operating on the sales promotion devices, and in sum, they act to create and manage the sales end of the distributed advertising according to the preferred embodiments of the invention. In either stand-alone or app software configurations, the stored program for managing these consumer purchases is programmable, configurable and otherwise capable of being controlled by the seller.

Before describing other portions of the invention, it is first useful to understand the business environment in which the present invention is intended to operate. The system of the present invention is designed and intended to match buyers that have indicated certain product or service preferences with sellers of the same. This matching function has several critical and unique aspects. First, the buyer's purchase preference data, and particularly the buyer's unique identification resides only on the buyer's mobile devices or at most in the networked cloud. To the extent that any buyer data is shared with the seller, it is done so without unique reference to the individual buyers. Second, the sellers are located in a particular geographical area; an area identified by the buyer as being one that is often frequented by the buyer and therefore, an area that is ideal for the identification of appropriate purchase opportunities based on the buyer's preferences. Third, the mobile network is integral to matching buyer and seller data. Each of the buyer and seller are somewhat agnostic as to the means by which they are matched, as long at the confidentiality of the buyer's uniquely identifying information is preserved and the seller has an opportunity to potentially increase sales by targeting buyers that have identified them as a preferred vendor, or by various other means as further discussed below.

On the sellers' side, the system of the present invention is particularly useful to small and medium businesses ("SMBs"). These are typically businesses that have one or more physical locations, both permanent and temporary, where a buyer may view, order, and purchase goods and services. The SMBs are distinguished from the large, nationwide, retail chains or franchised businesses in that they depend on local traffic for the majority of their sales opportunities. A cobbler or corner grocery stores within a major metropolitan area are prime examples of an SMB that would benefit from the system of the present invention. In either seller's case, the goods and services offered may exist and be offered for sale in both physical form (i.e. in store) and digital form (i.e. online). This is not to say that large retailers, which have greater marketing presence and typically extend their sales opportunities by simply attracting buyers to their large-box location, would not also find the system of the present invention useful. Since large retail chains also have physical locations, both permanent and temporary, a buyer may also add large retails chains for later purchase opportunities, most likely within preferred geographic areas set by the buyer. In this manner, destination places or destinations are thought of as physical locations, both permanent and temporary, where a user visits to order, shop, or purchase goods and services. Some examples of a permanent physical location include stores, malls, offices and amusement parks. Some examples of a temporary physical location include "pop-up" stores, concerts, trade shows, art fairs and mobile vending operations. Some examples of more permanent destination places are a large shopping mall, a city street or location, a strip mall or any other specific point of commercial sale.

Since the present invention is essentially an advertising platform, the term brand is used as a name, term, design, symbol, or any other feature that distinctly identifies one company's goods or services from those of other companies. A brand might be a type of product manufactured by a particular company under a particular name. Examples of brands include, but are not limited to, national food service chains, hospitality chains, national and regional banks, automobile brands, household products and food products. As far as the advertising of the brand, each brand is competing for a buyer's time and attention in order to build relationships with their target audience(s) or buyers. A brand is the set of expectations, memories, stories and relationships that, taken together, account for a buyer's decision to choose one product or service over another. Seller and advertiser are used herein interchangeably and may be thought of as any of a SMB, large retailer, destination place, brand or any combination thereof.

Figure 2:
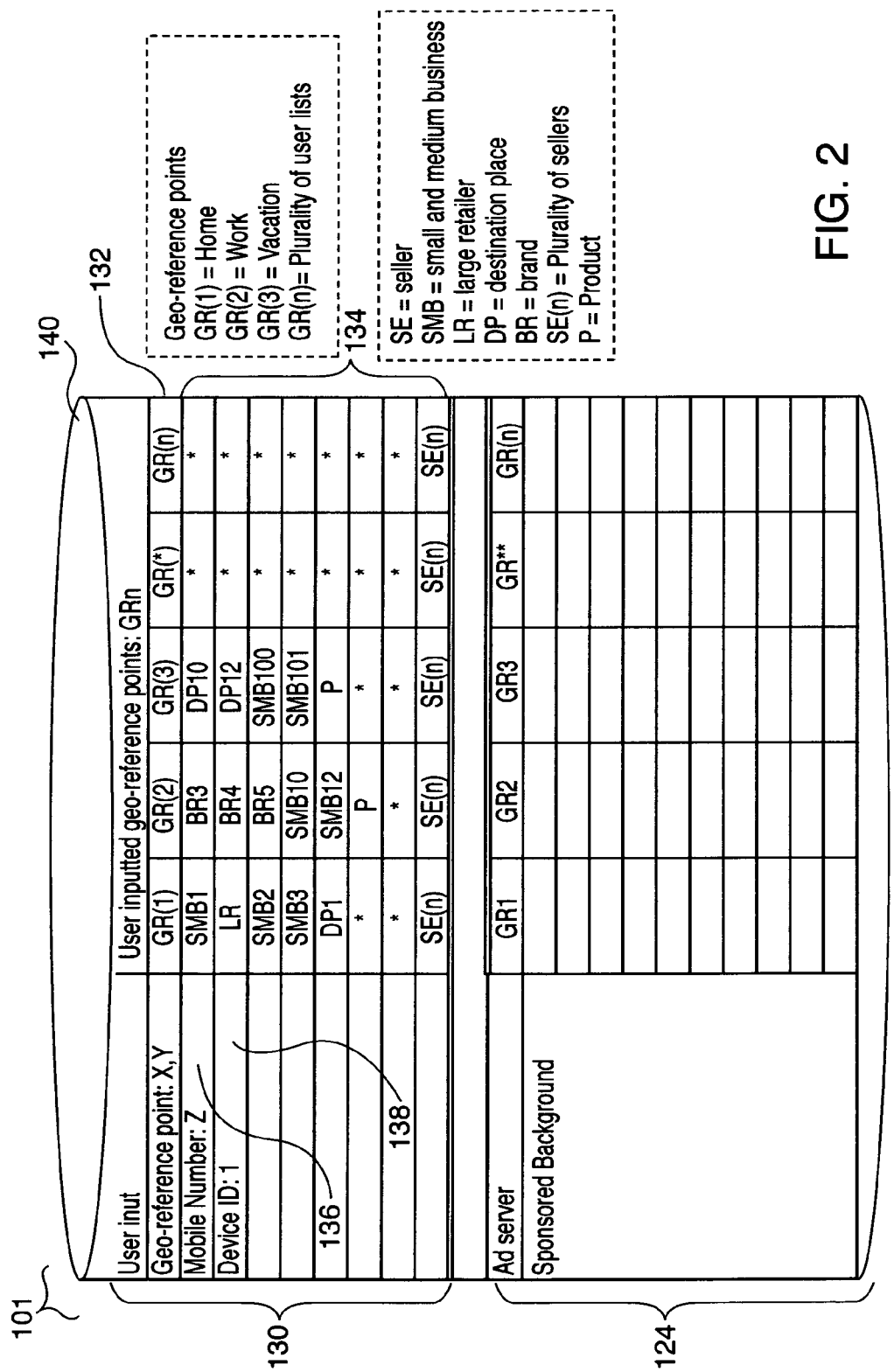
FIG. 2 is a data diagram illustrating data elements used by the user's mobile devices according to one particularly preferred embodiment of the invention.

FIG. 2 is a data diagram 101 that shows a data-centric view of the data stored within buyer's mobile device 22. In particular, certain data entered by the buyer 20 into mobile device 22 through the user interface 30 is shown at 130 and stored within local database 140. Non-user input data managed by the ad server is shown in section 124 and is also stored within local database 140. As part of the initialization of the database 140, the user 20 enters a plurality of geo-reference points 132. Each of the geo-reference points may be places or geographic areas in which the user is often located and in which he or she seeks purchasing opportunities. Examples of geo-reference points may include "home" locations, places of "work," travel or vacation. Geo-reference points may be input in a variety of manners. One such mechanism would be to use GPS identification functions provided by the mobile device 22. In other situations, the user may manually input coordinates through the user interface. In any case, the user then inputs a preferred list of SMBs, destination places, and brands as shown in section 134. Since many users have multiple mobile devices, possibly used in different locations, the system also makes available a set of user mobile device IDs 138 and associated mobile numbers 136. It should be appreciated that FIG. 2 provides only one arrangement of local database data and that other arrangements are also possible and fall within the scope of the present invention such as storage on the cloud. Further, the data itself may not be static within particular areas of the database or static with respect to its data associations. For example, if one particular user's mobile device is transported outside its "home" geographical area, that buyer may wish that the product and service offerings needed within that geographical area also be presented on the "alternative" mobile device. Finally, while some of the user's preferences, such as an SMB, may have one or more specific geo-reference sites, other buyer product specifications, such as brand or product, have no such association. In this case, the buyer may desire to be matched with a specified brand or product in any of the geographic locations in which he or she is located.

In one envisioned embodiment, the user controls all product selection criteria and will pick a preferred list of SMBs, destination places and brands from a master list. The master list is presented in menu fashion on the user interface which is necessarily associated with a physical location. These selections will constitute the user inputs and act as an alternative to the specifically selected values that are input by the user. As mentioned, the physical user location may be derived from any information the user inputs directly, examples of which include, but are not limited to, a parcel identifier, a geographic coordinate code ("Geocode"), a global positioning system ("GPS") coordinate, a country, a state, a county, a district, a zip code, a street address, a street corner, a public location and/or a public transportation location. This physical location information as input by the user is considered the geo-reference point of the user by the internet service provider. With respect to mobile users, the geo-reference point necessarily moves with the user.

It should be noted that a geocode is a deterministic value that uniquely identifies a seller regardless of other location-based data. For example GPS coordinates can be inexact as can street addresses. The geocode of the present invention uniquely identifies a particular seller in the context of this invention, and once determined, is input on the sellers profile panel at 264 of FIG. 3.

In another envisioned embodiment, the default list of vendors is conditioned by the mobile network and the ISPs which manage the information transmission to the potential buyers. In this model, the user may pick from a default list of SMBs, destination places, and brands associated with any geo-reference point input by the user. These entities are then screened and/or selected by the internet service provider 55 of FIG. 1. However, unlike the buyer-driven model, the ISP may screen the available default listings based on the inputs of a plurality of users 20 associated with the geo-reference of the physical location which the ISP then makes available through the mobile network 50 to all those users. These may even be selected on a bidding basis as described below. With respect to a user starting a new job, for example, it may difficult for the user to pick a definitive list of geo-references for immediate use. Therefore, it may be convenient to choose a default list of geo-references for immediate use, which that user may then alter as his familiarity with the geo-reference improves.

The flexibility of the user interface 130 enables the buyer 20 to add or delete SMBs, destination places and brands through navigation of the user interface. Further, various parsing and search modes may also be engaged within the interface, possibly with managed help provided by the ISP. The user can edit their user preferred list by adding, deleting, and storing individual SMBs, destination places and brands through the interface 30 utilizing these different methodologies at any time. Therefore, the user's repetitive interaction with his or her preferred content in combination with the constant updating and storing of relevant geo-centric lists, optionally as conditioned by the ISP, provides a rich buying experience and sales engagement potential for the user.

The ad server data found in database section 124 and managed by the ad server typically involves sponsored background advertisements and ranking of the same as described in more detail below. This portion of the user's local data base 140 is discussed in connection with FIG. 15 and in connection with the actual functioning of the sponsored background advertising. With respect to the user-input information in database section 130, the ad server acts to block or protect unique user identification data as it communicates with the network 50 and the ISP 55. Although the ISP and seller functions are described in more detail below, it should be emphasized and appreciated that the data having particular identifying capabilities with respect to the buyer, such as the mobile number and device IDs, are never transmitted to the seller. Instead, the ISP is the only entity that collects and retains this information and only for the purpose of establishing communications with the mobile devices on an as-needed basis. Depending on the default listings presented to the buyer, certain sellers may know only that a certain number of interested purchasers are proximate to their geo-reference. Based on this summary buyer information, sellers may condition their sales, promotions, and discounts appropriately, possible in connection with advanced advertising functions. These are also described in more detail below. It is this distinction, in combination with other aspects, which differentiates the present invention from other mobile advertising platforms designed and offered to-date.

Figure 3:
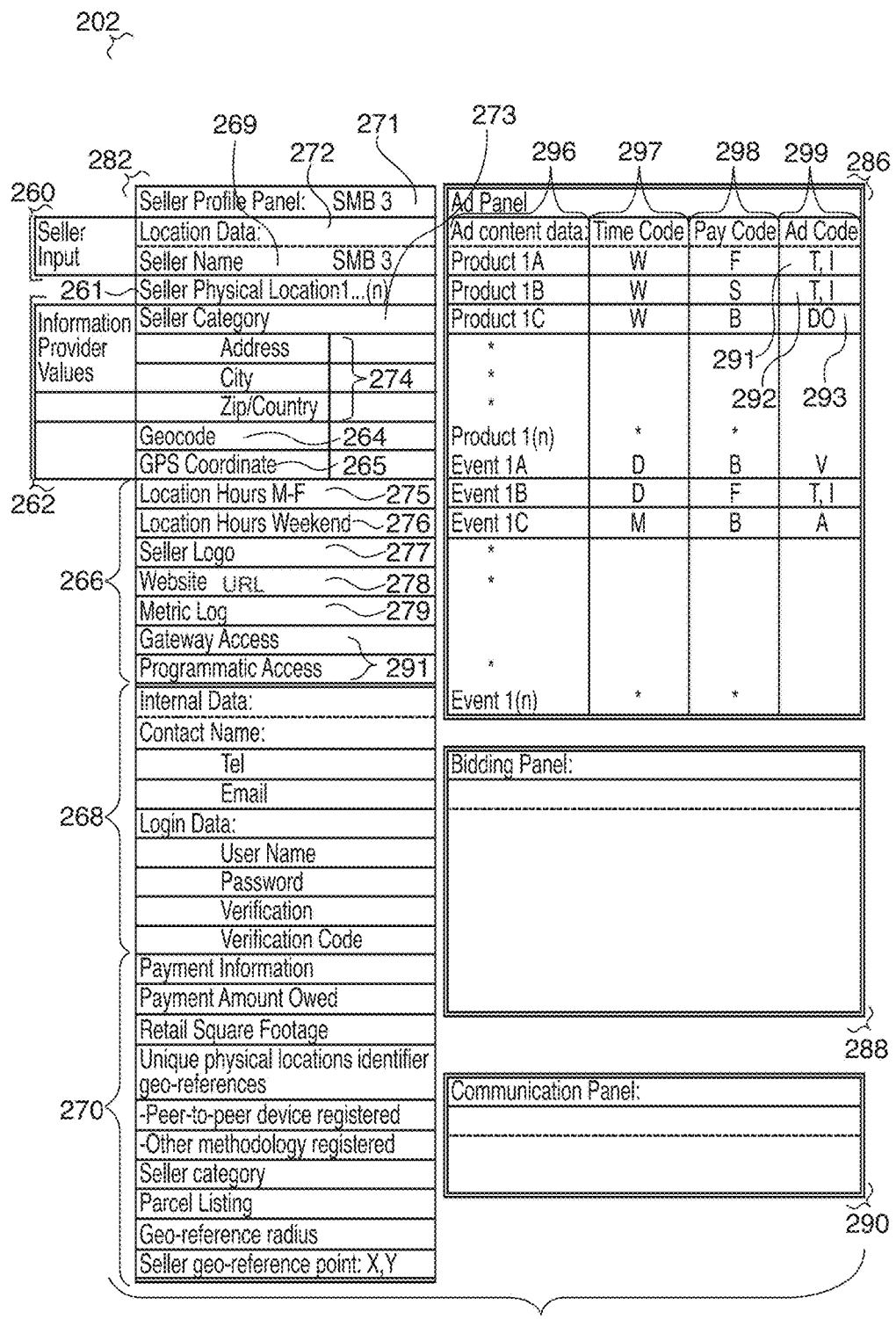
FIG. 3 is a data diagram illustrating data elements used by the seller dashboard according to one particularly preferred embodiment of the invention.

FIG. 3 is a data diagram 202 that shows a data-centric view of the data stored within the seller's dashboard panel 280. The seller's dashboard panel is, in turn, composed of at least four different panels: the seller's profile panel 282, the ad panel 286, the bidding panel 288, and the communications panel 290. The seller's profile panel 282 enables the inputting and updating of seller profile information. Data section 260 is provided for seller input and consists of the unique seller ID information 271 (SMB3) used by the system of the present invention, location data 272 identifying the location of the seller, the seller's actual name 269, and the seller's one or more physical locations 261. Data section 262 is provided within the seller profile panel 282 to house the ISP transmitted information. This is envisioned to contain data that is important for the ISP to use to match the buyers and their geographic and sales preference information with the seller's goods and services offered for sale. Subsection 262 might include information such as a seller's identifying category 273, the seller's physical mailing address 274 including the street address the city and the zip code, the seller's actual geocode 264 (as uniquely used by the system of the present invention) and the GPS locations 265 corresponding to the physical locations provided in 261. Other seller information may include: the hours of operation at particular locations 275, the seller's weekend hours 276, the seller's logo 277, the seller's website URL 278, the seller's metric log 279, and ISP access information and credentials 291. This access information might include an internet gateway access address and other programmatic access for use by the seller to allow users to have access to its commercial information—e.g. to browse store contents or a restaurant's menu for example.

Geocoding, as used in this invention, is a unique geographic tag used as part of the overall process of identifying a seller. It is the process of finding associated geographic coordinates (expressed as a singular site location or latitude and longitude) that uniquely identifies a seller. Geocodes may be derived from other geographic data, such as GPS coordinates, street addresses, or ZIP codes (postal codes). Geocodes are described in more detail below with respect to the operation of the present invention. Geocodes are unique as pertaining to a particular seller and within the overall geographic coordinates of the sales and advertisement system of the present invention.

In additional sections of the seller profile panel, information specific to the seller may be provide within data section 268. Included within this data section may be various internal seller data, a seller's contact name, telephone number, and email address. The seller may also wish to include various login data used to access the seller dashboard, such as the user name, password, verification codes and other verification information. Finally, the seller's profile panel may include other miscellaneous seller information 270 such as payment information, payment amount owed, retail square footage, unique physical location identifier, peer-to-peer registered devices, other device connection registration information, seller category, parcel listing, geo-reference radius within which the seller wishes to advertise the goods and services for sale, and the seller's geo-reference point X,Y with is the unique physical location corresponding to the sellers geocode.

The seller's dashboard 280 consists of programmable application functioning as a self-serve platform with primary functions that enable a seller to access, upload and transmit its corporate information, inventory information, and ad content associated with the seller including ongoing and upcoming sales and promotion cycles and the associated physical location for the same. The seller's dashboard 280 is envisioned to be accessed primarily through a mobile device such as a smart phone, tablet, wireless gadget, portable gadget, or portable personal computer, desktop computer, computer server, or smart television. The seller will use the dashboard to access all associated computer equipment, devices and display screens. In the brick-and-mortar world of actual store frontage, the seller traditionally places notices, specials, and advertisements on in front of their physical store location(s) to capture attention and draw foot traffic into their store from the existing, external pedestrian and vehicular traffic outside their physical store. In one particularly preferred embodiment of the present invention, sellers are able to create and access a seller account within data section 286 to input their specific ad content. This is provided for in the ad panel 286 in which the seller is capable of inputting and updating seller ad content. Within ad panel 286, there are several associated columns of information. For each product to be listed in a mobile advertisement 291-293, the following relevant data is included: content of the ad data 296, and a time code 297 indicating when the ad should be displayed (e.g. W for the week of the year in which the ad should be run). The seller may also associate each item of the seller ad content with a pay code 298 input by the seller. These pay codes would be used by the information provider to determine how that ad content would be positioned within the mobile device display depending on the user preference and setting. These pay codes may include but are not limited to nonpayment (F=free), subscription (S=recurring payment), and bidding (B=bid for ad priority within user interface). Actual prices quoted to the mobile network from the ad panel may be static or they may vary considerably based on any of a number of factors. In one highly dynamic pricing structure, the amount quoted for an item is derived by the ad panel as based on a combination of time code, ad code, and pay code attributed to each item. Finally, the ad code 299 is provided for each advertised good to identify the formatted nature of the advertisement, e.g. data object (DO), text (T), image (I), audio (A), and video (V). These formats may be tied to the to various payment options for each element of the ad content within the dashboard given the precious nature of the bandwidth restrictions on the overall mobile advertising system.

Two other data areas are included as part of the seller dashboard 280. First, the bidding panel 288 is provided and serves to enables the ranking and inclusion of a seller's ad content for distribution throughout the system 10 and display within the ad sponsored background on the user interface and ad server of the plurality of system mobile devices. This is described in more detail later in connection with FIG. 15. The communications panel 290 enables the user to communicate with and share data with the seller and also serves to enables the seller to communicate and share with the information provider. The communication panel may include real-time communication interfaces, such as a simple text box, electronic suggestion box, email box, etc. to facilitate communications between buyers and sellers.

Figure 4:
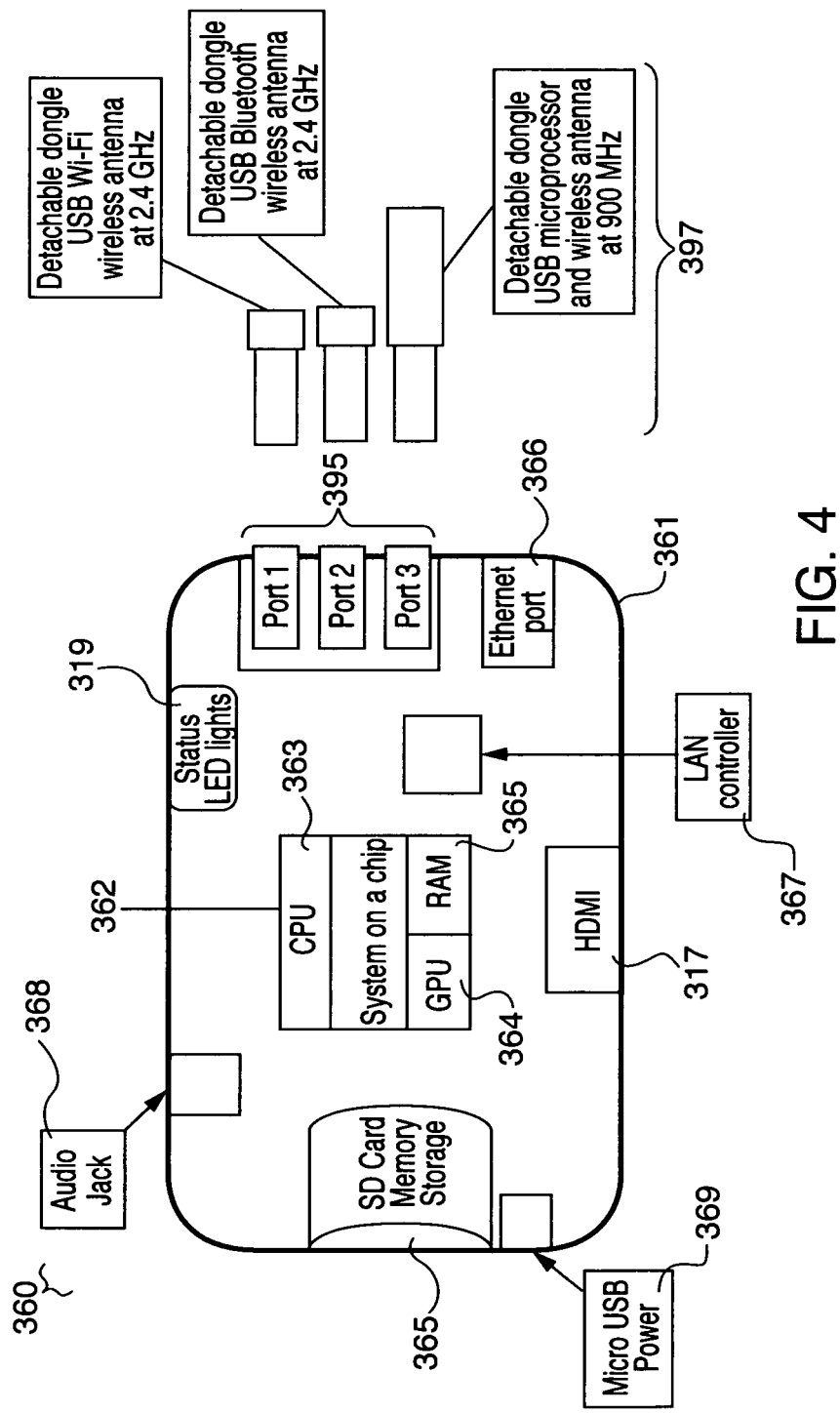
FIG. 4 is an block diagram example of a physical location device according to one particularly preferred embodiment of the invention.

FIG. 4, illustrates a block diagram of a physical location device 360. The physical location device is resident at a physical seller location and acts as a distribution point for a seller's ad content as well as possibly providing a networked wireless connection node to mobile devices 12 as they traverse the seller's establishment or its proximity. This physical location device will typically be a small-sized, low-power computer (or system on a chip) 362, located on a single circuit board 361, utilizing a system on a chip comprising at least one of a central processing unit ("CPU") 363, a graphics processing unit ("GPU") 364, and one or more memories including random access memory ("RAM") 365. Circuit board 361 may include a LAN controller 367 and associated Ethernet port 366, a ultra small flash memory card slot ("SD Card slot") 365, audio jack 368, a micro-USB power adapter 369, high-definition multimedia interface ("HDMI") 317, and status-oriented light-emitting diodes ("LED") 319.

A series of USB ports 395 are also included on physical location device 360. These ports are to accommodate various circuit board input/output ("I/O") functions. Removable, wireless or radio frequency USB dongles 397 may be inserted into USB ports 395 to complete the communications architecture. Each dongle typically also includes its own microprocessor as well as, a wireless radio transmitter and an antenna. In operation, the computers on the dongles, in connection with the programs within the system on a chip 362, run programmable application software application that operate to wirelessly transmit a seller's unique physical location identifier. This wireless signal is used to communicate with other nearby devices, remote hub devices, wireless routers, smart TVs and user mobile devices using Transmission Control Protocol ("TCP") and the Internet Protocol ("IP") via wireless Wi-Fi, Bluetooth, or other unlicensed spectrum such as within the 900 MHz spectrum band. Much like the vendor advertisement chalkboards found on street sidewalks, the physical location device is located at the seller physical location and may be attached to a front window, front door, or point of sale counter utilizing screws, tape or Velcro fasteners.

As with all other programming described herein, the programmable software application running on the wireless dongles 397 and the system on a chip 362 will typically be developed with a suitable programmable language, such as, but not limited to, object-oriented languages, C, C++ and/or Java. Through this software, the seller's physical location device serves as a two-way transmitter using low data bandwidths in both licensed and/or unlicensed spectrum space. The programmable software application's primary function is to enable communication with a user device at the seller physical location thus enabling the physical location device to transmit an identifying code to uniquely identify and correlate the seller to the user preference list.

Further, the physical location device 360 and its wireless connections provide user devices 12 to access more of the data within the seller dashboard 80—certainly more data than that provided through the wireless ad content distributed by the overall advertisement system 10. For example, full weekly circulars, the entire store inventory and price list of the seller may be made available to the user's mobile devices 12 through this interface when the buyer is near the seller's geo-reference and in networked contact with physical location device 360.

In combination with other proximate physical location devices, the programmable software application operating on the dongles 397 and circuit board 361 may specify higher level network and communication protocols to communicate with other seller's physical location devices within the wireless transmission capabilities of the wireless transmitters and antennae. In this manner, a wireless, ad-based antennae array may be created, particularly within crowded commercial areas such as major metropolitan streets or large indoor commercial establishments such as a mall. Although the physical location device is envisioned to be relatively low-powered in its transmission capability, any one antenna may transmit data over long distances by passing data through other connected physical location devices to reach more remote physical location devices without wireless or wired broadband service provider access to the internet. The data transmission requirements of these physical location devices are expected to provide a transmission range from 10 feet to 100 meters in a line-of-sight fashion, depending on one or more of the antenna power outputs, wireless frequency band used, local geography and environmental characteristics. The data transmission rates may vary from 1 megabit per second ("Mb/s") in the 900 MHz frequency band to 150 Mb/s in the 2.4 GHz frequency band.

Figure 5:
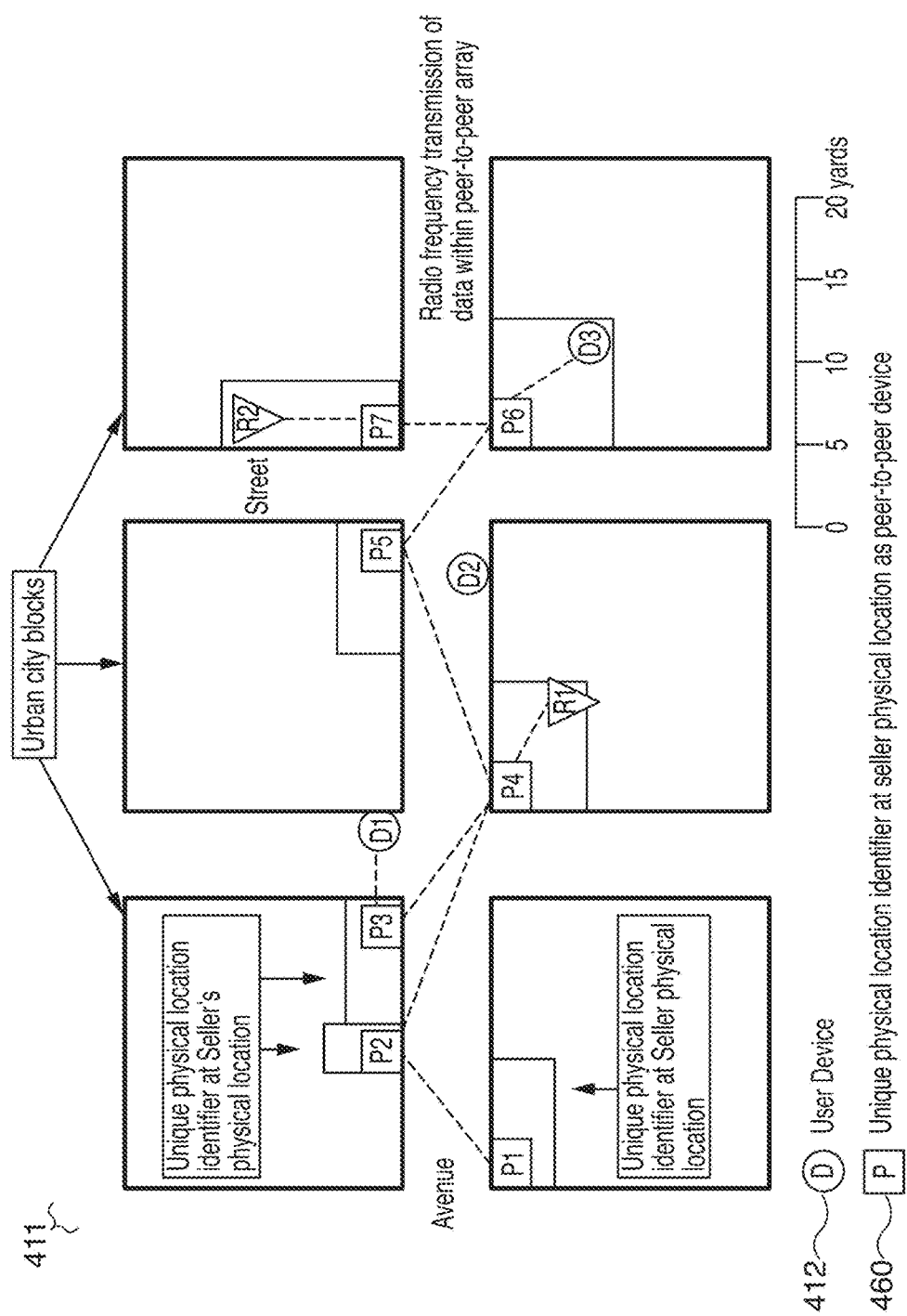
FIG. 5 is a geographical peer-to-peer network representation of a plurality of the physical location devices according to one particularly preferred embodiment of the present invention.

FIG. 5 illustrates a spatial, geographic and data flow diagram 411 providing examples of some of the peer-to-peer networking functions available to the array created by a plurality of the physical location devices. Physical location devices 460 P1-P6 are situated at respective seller physical locations along an avenue of city blocks, shown as streets between buildings in FIG. 5. Data may be synchronized between physical location devices regardless of the internet connection provided to any of the devices. D1-D3 represent unique user devices 412 within the peer-to-peer, ad-centric wireless network. R1 and R2 are wireless Wi-Fi routers 473 operating at seller's physical locations and which have access to the internet through commercial broadband and cellular data providers.

As shown in FIG. 5, physical location devices P4 and P7 are peer-to-peer networked devices that have internet access at the sellers' physical locations through routers R1 and R2 respectively. Physical location devices P1, P2, P3, P5, and P6 do not have commercially provided internet access at their respective sellers' physical locations. P1, P2, P3 are able to pass through data transmissions to P4 and receive data transmissions from P4 which has internet access through the R1 wireless Wi-Fi router. Therefore P1, P2, P3, and P4, coordinating as an array of seller peer-to-peer networked physical location devices, enable each of the physical location devices of the invention to coordinate data, provide the mobile devices 412 with advertisement-based data, and provide general low-bandwidth access the internet through connected ISPs. Likewise, P5 and P6 are able to pass through data transmissions to P7 and receive data transmissions from P7 which has internet access through wireless Wi-Fi router R2. Using this technique, and enabled by the programmable software applications on the wireless dongles and the physical location devices, these physical location devices may now transmit data over longer distances than those enabled by the limited wireless router transmission capabilities and further include devices that have no commercially-serviced network access.

With respect to the operation of user devices, user device D1 is communicating from outside of the seller's physical location which has physical location device P3 displayed on the seller's storefront window. In this example, the user interface on D1 allows the user to add the seller represented by the unique physical location identifier from P3 to the user's targeted list of sellers on the user device and as specified by the seller's geo-reference point. The D1 user interface determines the quality of the data transmission from P3 and decides whether to request ad content from P3 or determine a better quality of data transmission when available, to request the ad content from the information provider.

Before the operation of the invention is described with reference to a specific geographical context, it is instructive to discuss the buyer and seller inputs and data flows provided by system 10. As stated, a primary object of the invention is to maintain a buyer's privacy while somehow matching buying preferences to sellers' offerings. Likewise the relevant sales information and ad specific content of the seller is to be provided to the appropriate buyers. All of this is done with reference to the geographic proximity of the buyer and seller and possibly in the context of temporally conditioned advertising. Therefore, the end goal is to establish a simple, geo-centric, and possibly time-based, association between a buyer's geo-reference point and seller geo-reference point in which the buyer's preferences are matched with the sellers offerings at a mutually convenient time so as to effectuate the ad distribution and complete a resultant sale.

One of the novel aspects of the present invention is the function and location of the buyer's ad server 24. Unlike many of the presently operating business models for commercial advertisement distribution, and the inventions pertaining to the same, the buyer's ad server is on the actual user device 22. It is not part of the seller's ad distribution system, nor are any of the management elements on the mobile network 50 or housed within the ISP's cloud structure 57 and associated hardware and software. The ad server manages all of the specific buyer's preferences, geographic areas of interest and displayed content. The entire management process is user-driven and programmatically selectable by the user. Descriptions regarding the actual mobile device displays are provided infra with respect to the discussion of FIGS. 16-20.

The mobile network's role in this process is to maintain the anonymity of the buyer, match geographic information of the respective buyer-seller pairs, match preference and advertising information of the respective buyer-seller pairs and push the sellers' advertising content to the buyer's mobile device 22 to be displayed on its UI 30. What the buyer does with it from there is up to the ad server 24 on the buyer's device as conditioned by the buyer's preferences as executed through user interface 30 on mobile device 22.

As discussed in part above, the buyer's preferences as entered into user interface 30 and mobile device 22 drive the overall purchase decisions and shopping process. Geographic locations 132 of interest are identified and added by the user. These may simply be input by the buyer, added while walking about, or selected from a map. These geographic locations may be transcribed to geocodes as required by the implementation of the system 10. The buyer then inputs sellers of interest, user-targeted lists of SMBs, destination places and brands 134 of interest. These may be individually entered or made available from a prefabricated menu structure or drop-down boxs presented to the user. Deletion of a seller, product or destination place likewise results in the disassociation of a particular buyer's geocode GR(n) from the user's mobile device. In this manner, and as shown in FIG. 2, one particularly preferred organization of the purchase preference data is a geocentric one, i.e. one in which the index is the geographic identification of a location in which the buyer frequently find himself or herself, and/or in which he or she is somehow interested in managing a purchasing decision. Those of skill in the art may appreciate that other forms of data organization and association, including the use of alternative data groups and indices may also be used to achieve similar ends. The geocentric model of purchasing, however, is one of the more natural paradigms for mobile devices, mobile buyers, and sometimes even mobile sellers, since co-location of the buyer and seller are necessary for a real world purchase. Notwithstanding differences in possible data organization, the teachings of the present invention may also be used to for forecast sales in which a buyer (or seller) intends to be in a particular geographic location in the future but wishes to have knowledge of or evaluate the purchasing decisions and shopping opportunity beforehand.

Again, the user device becomes a useful reservoir of purchasing opportunities when the buyer is physically present within a selected geographic area of interest. As a user configurable option, advertising material may be continuously pushed by the network to the mobile device on a real-time basis at all times or only when a user is within the particular geographic area of interested and is open to purchasing opportunities or temporal intervals matching seller interval cycles. The former might be useful to plan a travel itinerary for a day out of shopping. The latter may be useful during a working day in which only possible locations for good deals on bread, milk and toiletries are desired. As mentioned, an ad server on the buyer's device, under the control of the buyer, is the ultimate arbitrator of the information conveyed to the buyer.

From a seller's perspective, the following information flow occurs. The physical location of seller is derived from information the seller 70 inputs to the seller profile panel 82. This can be derived from one or more of the following data elements input into that panel including: parcel listing, geographic coordinate code ("Geocode"), global positioning system ("GPS") coordinate, country, state, county, district, zip code, or street address. A parcel listing is associated with real estate tax systems and can also include national, state, and county managed real estate property. The physical location information input by the seller is provided to the information provider 55 within the mobile network 50 and is verified by the information provider through on-site verification and/or third party verification services. A seller geo-reference point pertains to a seller's single physical location. A seller account can register and maintain a plurality of seller physical locations 261 within the seller profile panel 282, each with a seller physical location associated with a unique geo-reference point. A seller account can further specify a physical geographic boundary or radius from its geo-reference point (shown within 270 of FIG. 3) within which the seller is interested in delivering content to buyers that have flagged a geocode within that geographic boundary.

In operation, the seller transmits its ad content to the ISP 55 directly from the ad panel. Such information would conceivably include product sales details, associated time-based sales offers and ads, and any specialized price computations made by the ad panel based on the information therein. The internet service provider then performs the above-described matching functions for buyers and pushes the advertising content appropriately.

On a more local level, it should be appreciated that the above-described peer-to-peer network may also be used without the assistance of the internet service provider to disseminate the same information. When using the peer-to-peer network, the data transmission and availability may be broader than that provided through the ISP, particularly when the network detects that an interested buyer is geo-located within a range of the seller's location. Nevertheless, the identity of any particular buyer is privately maintained since the information flow is nothing more than site location of the buyer, interested seller identification and data transfer to the buyer's mobile device.

FIGS. 6-12 provide a series of geographic representation of the operation of the present invention according to several preferred embodiments.

Figure 6:
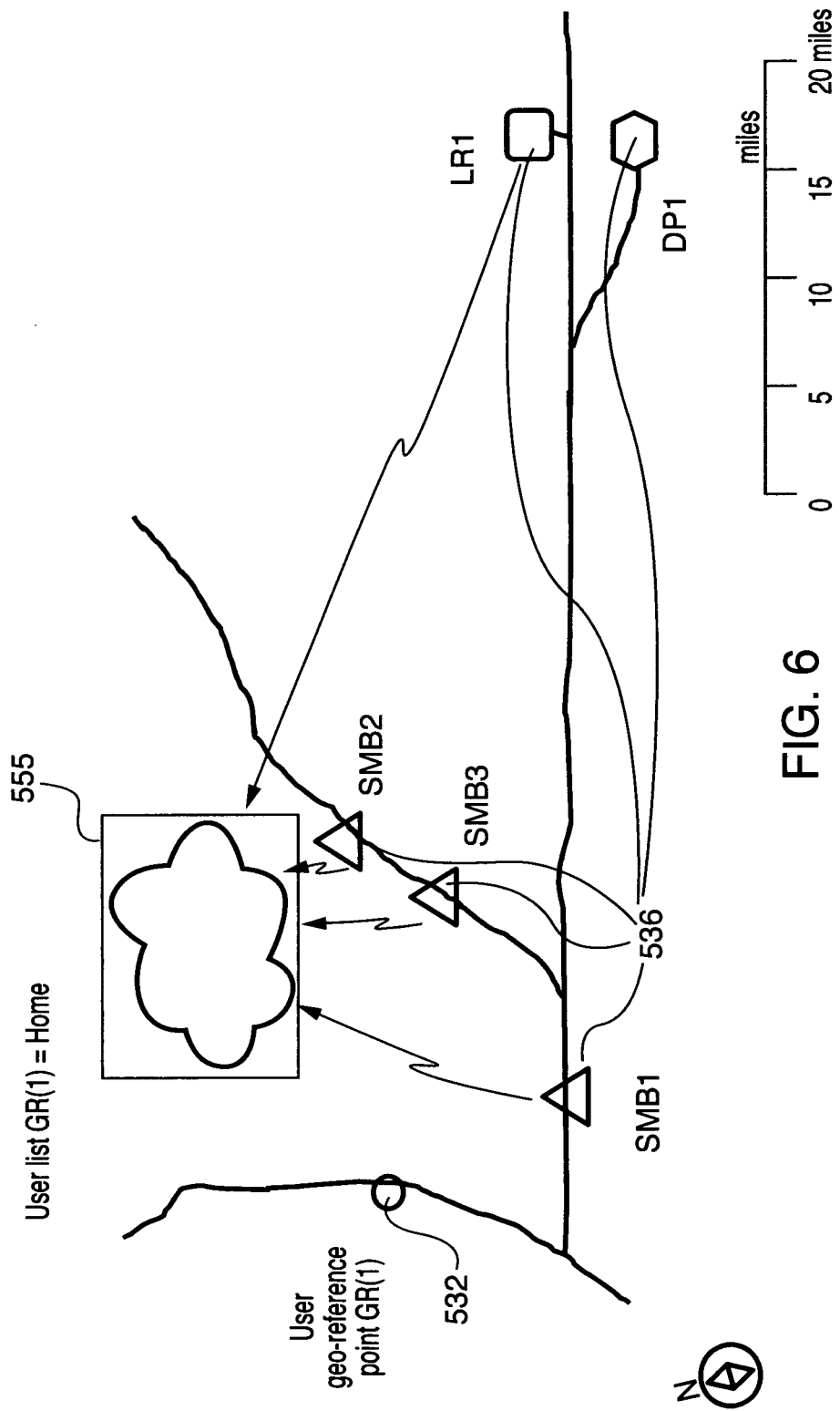
FIG. 6 shows a geographic depiction of the operation of the present invention according to one preferred embodiment.

As shown in its most fundamental depiction, FIG. 6 shows a user-selected geo-reference point GR(1) 532 that has been flagged as a point of interest by the buyer. In this example, GR(1) pertains to a home location of the buyer. The user's selected or physically determined location GR(1) is known to the internet service provider 555 by virtue of its data connection to the same. Given this, the user-created target lists of sellers that are within a certain distance of the buyer's geo-reference point of interest are pushed to the buyer's mobile device based on the previously input user information and are displayed in map format thereon. In this manner, geo-centric associations between the user input geo-reference point GR(1) and a plurality of sellers 536 identified by their geo-reference points SMB1, SMB2, SMB3, LR1 and DP1 is made by the overall advertising system. In the particular example of FIG. 6, the distance scale is shown as parsed in 5-mile increments. Presuming that the buyer is present within or proximate to his or her geo-reference point GR(1), subsequent visitation of any of the sellers on the buyer's list would most likely require the buyer to drive a motor vehicle in order to reach any of the seller's physical locations. Thus, the physical, real-world variables of time management, convenience and price of gasoline will be some of the considerations taken into account by the user in selecting sellers that are to be visited as part of the sales experience. Again, with the assistance of the internet service provider, the buyer is enabled by the user interface on the mobile device to track the user-derived list of seller physical locations and determine the availability of specified products or brands of interest, while also being provided relatively instant access to which of the proximate seller's are running promotions and any associated timing elements regarding the same.

Figure 7:
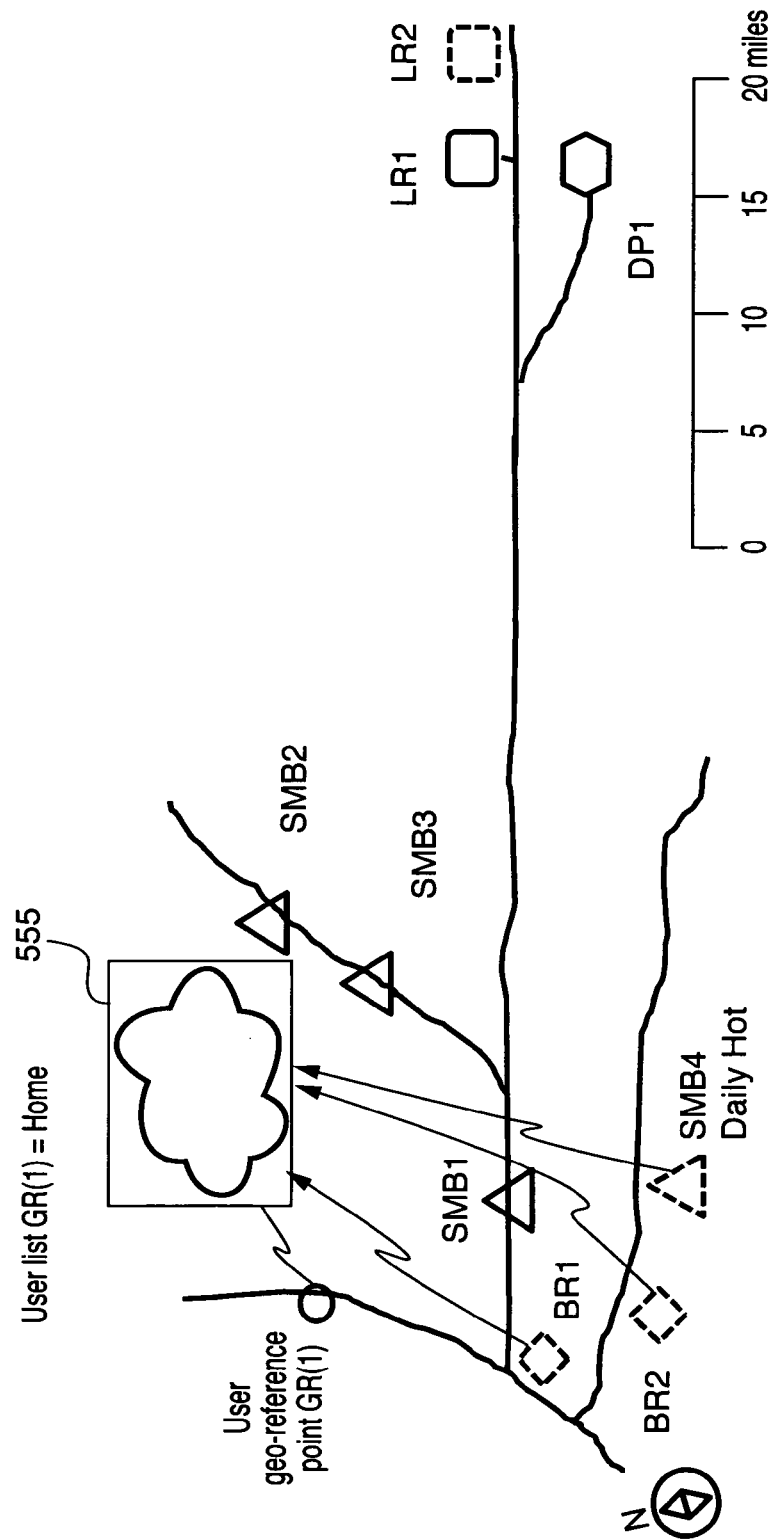
FIG. 7 shows another geographic depiction of the operation of the present invention according to another preferred embodiment.

FIG. 7 shows a variation of FIG. 6 in which individual brands BR1 and BR2 are identified as being of interest to the buyer and are also pushed by the internet service provider to the buyer based on geo-location GR(1). This may in fact be a configurable option on the buyer's mobile device. For, example, the user interface may provide the buyer the option to be made aware of sales that pertain to certain brands regardless of the inclusion of a seller within the user profile or the buyer's actual geo-location. Further, additional sellers SMB4 and LR2 of those brands may also be presented to the buyer if so configured on the mobile device and desired by the buyer.

Figure 8:
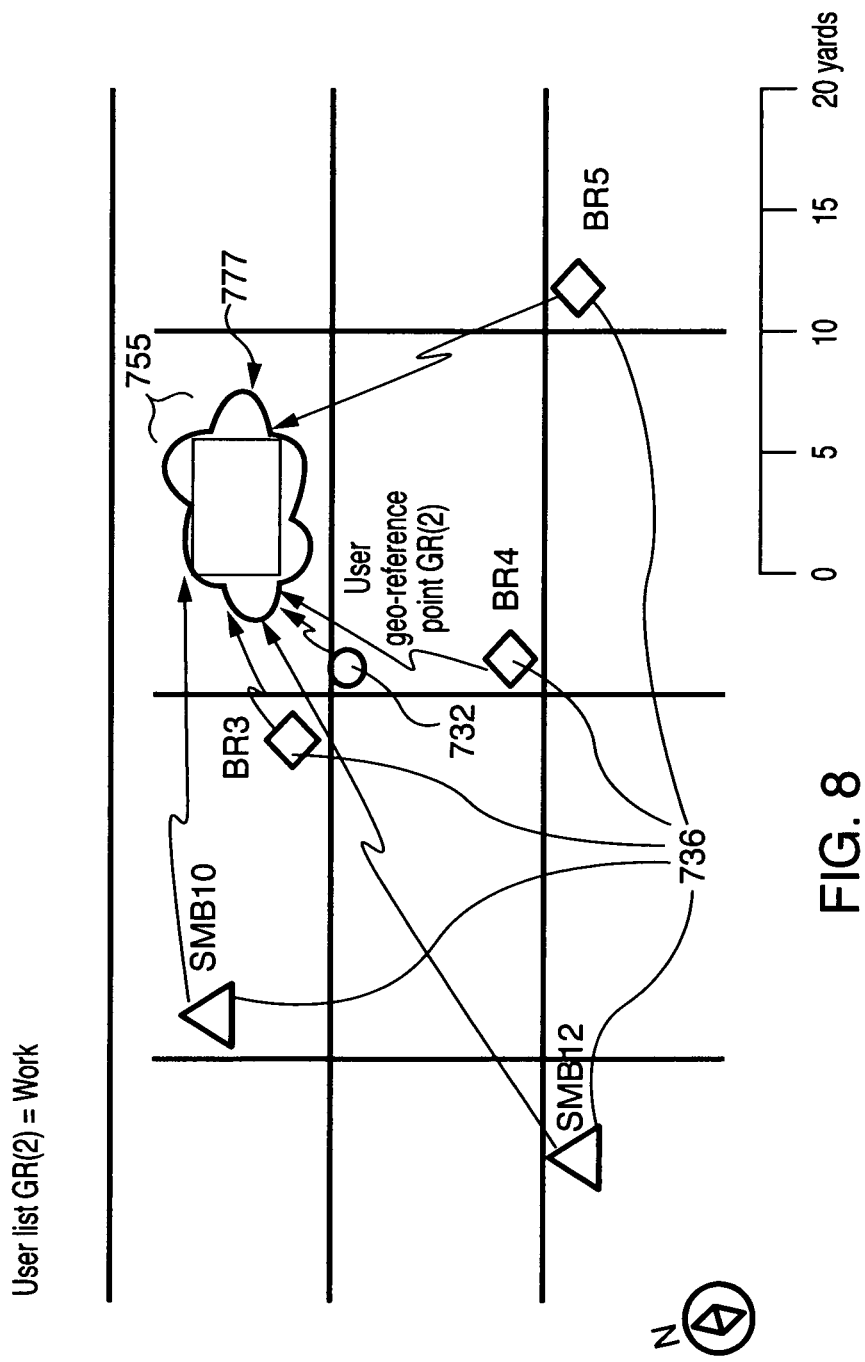
FIG. 8 shows another geographic depiction of the operation of the present invention according to another preferred embodiment.

FIG. 8 shows an urban variation of the geographic representation presented in FIG. 6. In this environment, a different geo-locator GR(2) 732 is selected within the user profile as being the preferred geocode for ad distribution. This particular geo-location reflects the buyer's work location. As with FIG. 6, the user's selected or physically determined location GR(2) is known to the internet service provider 755 by virtue of its data connection to cloud 777 and associated mobile network containing the same. Given this, the user-created target lists of sellers that are within a certain distance of the buyer's geo-reference point of interest are pushed to the buyer's mobile device based on the previously input user information and are displayed in map format thereon. In this manner, geo-centric associations between the user input geo-reference point GR(2) and a plurality of sellers and brands of interest 736 identified by their geo-reference points SMB10, SMB12, BR3, BR4 and BR5 is made by the overall advertising system. In the particular example of FIG. 7, the distance scale is shown as parsed in 5 yard increments. Presuming that the buyer is present within or proximate to his or her geo-reference point GR(2), the buyer is likely to be able to walk in order to reach any of the seller's or brands so as to show physical locations. Again, with the assistance of the internet service provider, the buyer is enabled by the user interface on the mobile device to track the user-derived list of seller and brand physical locations to determine the availability of specified products or brands of interest, while also being provided relatively instant access to which of the proximate seller's are running promotions along with any associated timing elements of the same.

Figure 9:
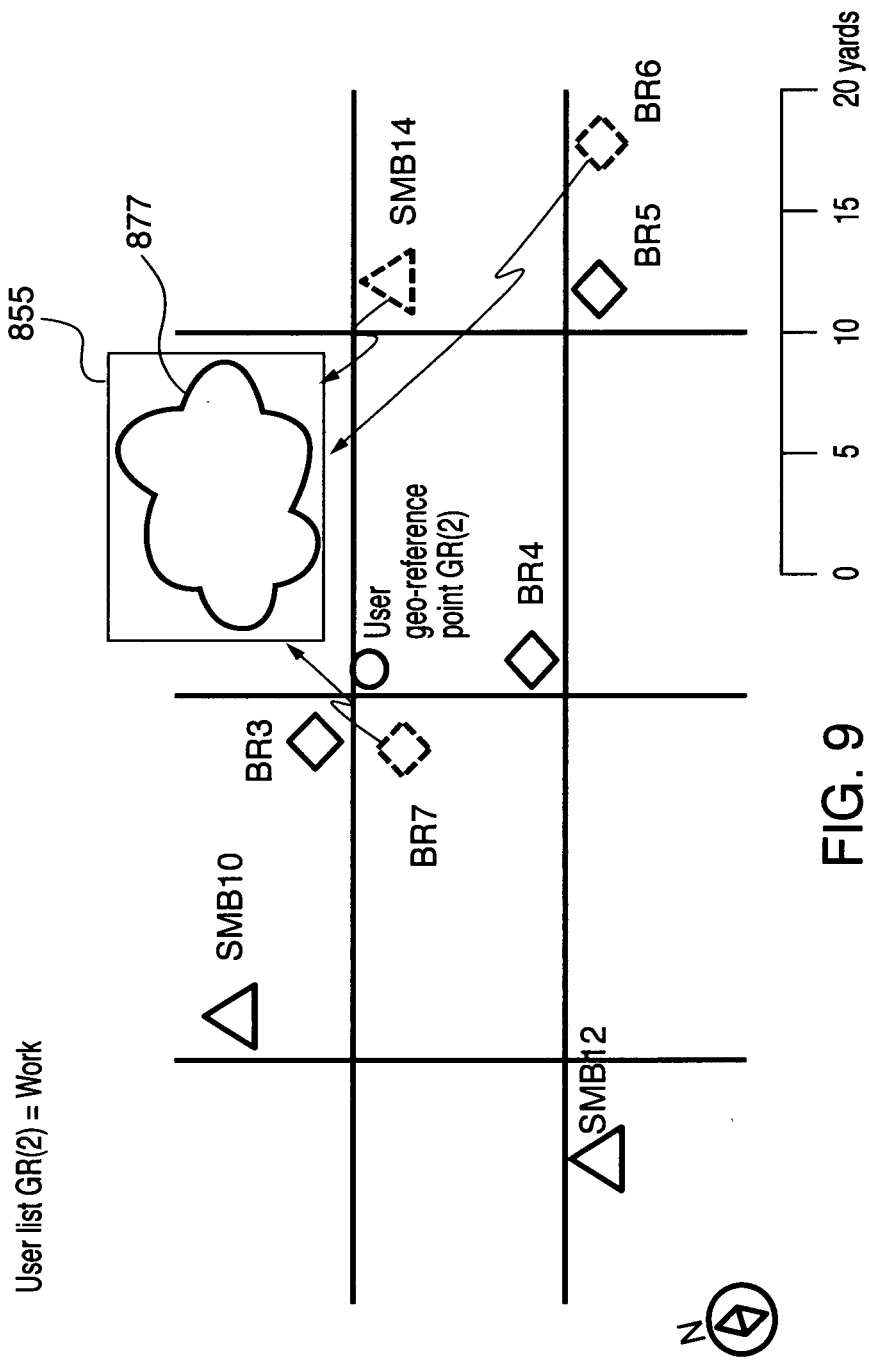
FIG. 9 shows another geographic depiction of the operation of the present invention according to another preferred embodiment

FIG. 9 shows a variation of FIG. 7 in the urban context described above with respect to FIG. 8. Here, individual brands BR6 and BR7, which are identified as being of interest to the buyer, are pushed by the internet service provider to the buyer based on the buyer's geo-location GR(2). Such buyer brand notifications, i.e. irrespective of the buyer's specification of sellers, may in fact be a configurable option on the buyer's mobile device. For, example, the buyer's user interface may provide the buyer the option to be made aware of sales pertaining to certain brands regardless of the sellers within the user profile or the buyer's actual geo-location. Further, additional seller SMB14 of those brands may also be presented to the buyer if so configured on the mobile device and desired by the buyer.

In FIGS. 6-9, the selection of the displayed sellers, brands, products and destinations on the buyer's mobile device were based on a physical distance measurement selected by the buyer and as determined by the internet service provider and its GPS determining apparatus 52. As with all data and display characteristics of the present invention, the buyer's input governs the ad system's operation and resultant display of relevant data. Certain other methods of displaying ad content on a buyer's mobile device may be considered, however. In these methods, the seller plays a more active role in determining the goods and services transmitted to the buyers for ad display. This is particularly applicable when the seller has limited inventory, or wants to tease buyers to make purchases based on highly local sales advertising. One such system and method of seller conditioning is provided in FIG. 10.

Figure 10:
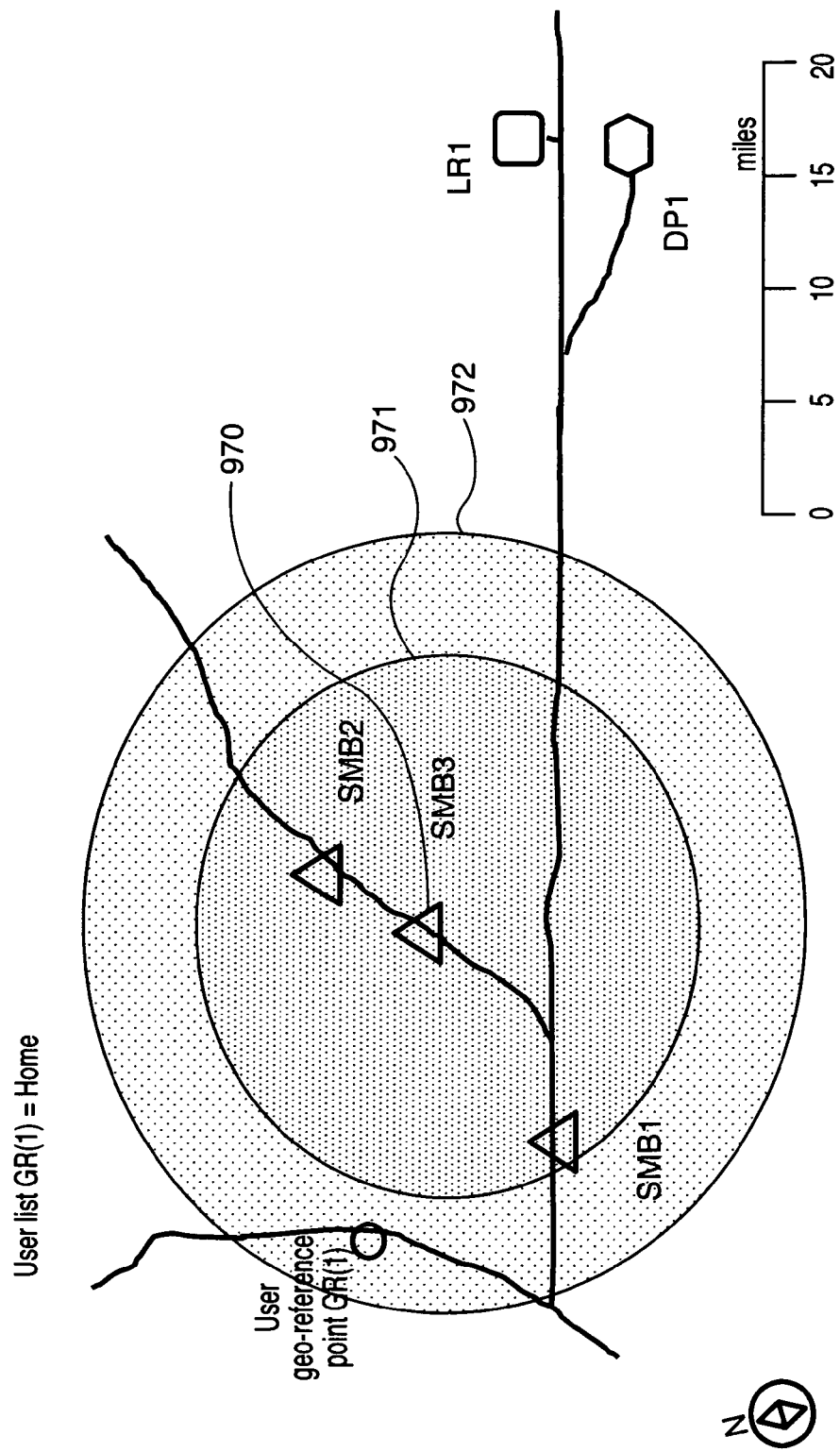
FIG. 10 shows another geographic depiction of the operation of the present invention according to another preferred embodiment

FIG. 10 shows an alternative embodiment to the geographic layout of FIG. 6. As an adjunct to the system described in connection with FIG. 6, the seller may take a geo-centric view of the ads to be delivered. When the buyer's preferences for distance from the buyer's geocentric location match that of the seller, in combination with a match of buyer's preference for sellers, products, brands and/or destinations, a match is declared with the aid of the internet service provider GPS functions and the sellers ads are transmitted to the buyer. Specifically, in the example of FIG. 10, the seller may select a radius about its geo-reference point and within which it wishes to circulate its ads provided that the seller and/or its goods and brands is on the respective buyer's lists. This radial data element is shown in the seller profile panel as the "geo-reference radius" within data section 270 of FIG. 3. As shown in FIG. 10, seller SMB3 is shown at the epicenter of the inner radial circle, and therefore, is the one entity taken into consideration as part of the overall ad distribution. Each seller may, of course set its own ad distribution radius. FIG. 10 is provided in simplified form, however, to depict only one such seller configuration.

Again with respect to the seller-specified ad distribution radius, this parameter may be input by the seller as a static value, or it may have dynamic components based on various criteria selected by the seller. In one dynamic-based embodiment, the radius is determined by the internet service provider utilizing algorithms based on the seller category 273 and possibly the total number of users identified as having a geo-centric association with the seller within the circles. The seller may in fact be interested in expanding the radius if the number of sellers is over a certain threshold since the probability of creating larger numbers of geo-centric associations is greater. This ad to be disclosed and the buyers to whom they are distributed is determined by the internet service provider since that entity would have all the buyer's profile information, as it pertains to sellers of interest, at its disposal. A seller may additionally specify additional radii having different circumferences so as to accommodate weather, topography, a seller category 273 and the total number of interested buyers within either of the two radii. A seller may start with one radius of interest 971, and depending on the above criteria and the response of the buyers to the ad distribution, the seller may increase that radius to the second level 972 to attract more customers. Additionally, these radii may have time-based components that affect the display of the seller's ads on the buyer's mobile devices. Depending on the locations of the respective buyers' within those radii and their respective distance parameters, the buyer's will receive the sales and ad notifications from the seller.

Certain other methods of conditioning the distribution of ad content may be considered, however, particularly when the buyer's preferences indicate a particular brand or product. Since brands and products do not have a geo-centric presence apart from their sellers, numerous alternative methods of notifying buyers of the availability of these preferences may be employed. One such system and method is through the use of the seller's bidding panel 88 on the seller dashboard 80.

Figure 11:
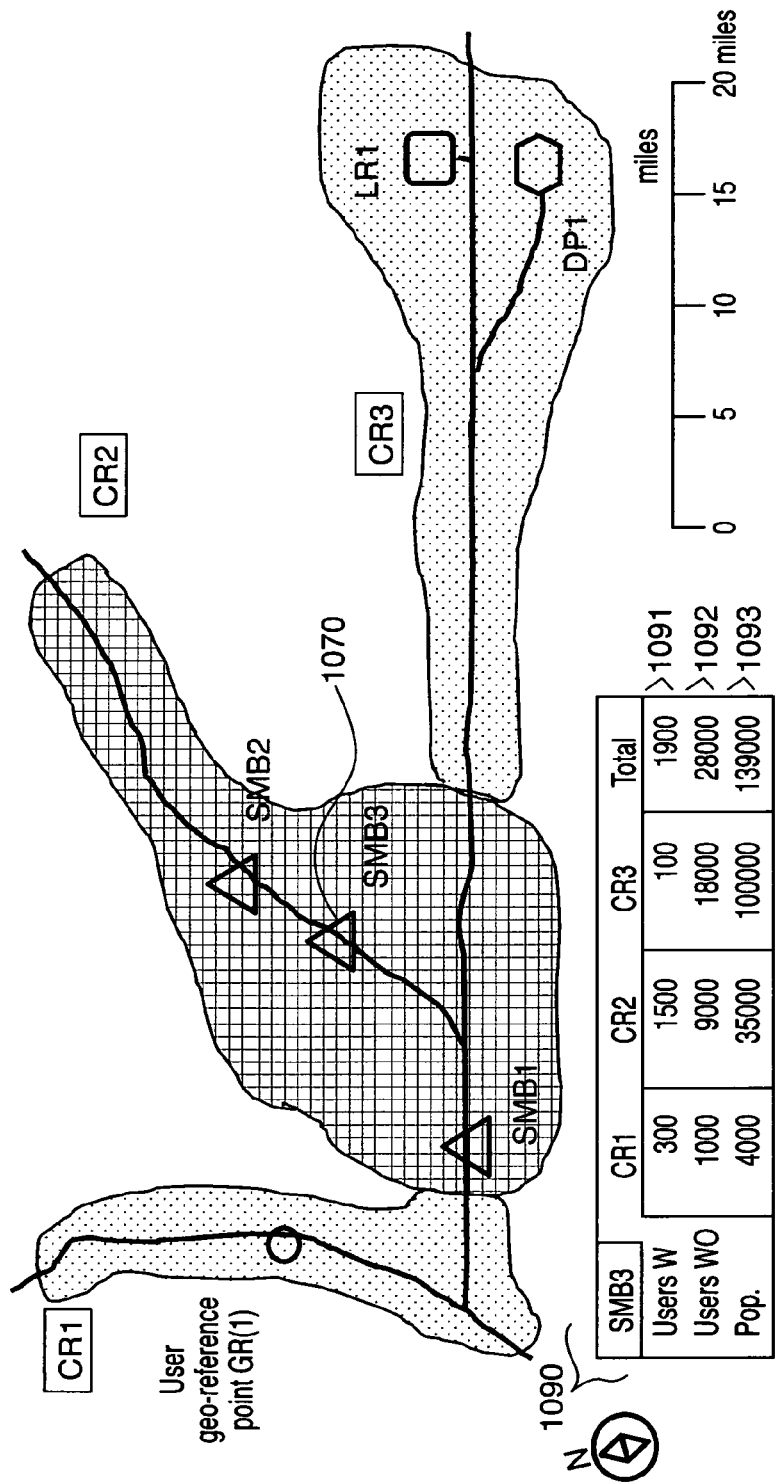
FIG. 11 shows another geographic depiction of the operation of the present invention according to another preferred embodiment.

FIG. 11 shows yet another alternative embodiment of the geographic layout of the sellers provided in FIG. 6. However, this graphical depiction is intended to provide sellers with useful marketing information in connection with the present invention. As shown, the geography of FIG. 6 has been segregated into three separate geographic areas CR1, CR2 and CR3. Each of these three areas represent distinct areas in which a seller may be interested in bidding for advertising placement and may compete with other sellers for such placement. Geographic areas are shown as having irregular boundaries and correspond primarily with population centers with CR1 being more rural, CR2 being suburban, and CR3 denoting a more urban area. The seller of interest SMB3 1070 is located in CR2. Chart 1090 shows data corresponding to the three areas and in which seller 1070 may take note in making ad purchase decisions. Chart 1090 shows the three areas as indexed against three population groups. At row 1091 ("W"), the number of mobile users having a geo-association with SMB3 are shown within each of the geographic areas and also as a total for the sum of the areas. More particularly, row 1091 ("W") shows the number of mobile device users of the present advertising system that have SMB3 designated as a preferred seller on their mobile devices. At row 1092 ("WO"), the number of mobile users on the advertising system that do not have a geo-association with SMB3 are shown within each of the geographic areas and also as a total number of mobile device users for the sum of the areas. Finally, at row 1093 (Pop), the total population for each of the geographic areas is provided including the sum of all the areas. The internet service provider(s) handling the three geographic regions would be able to determine and provide access to the user counts for rows 1091 (W) and 1092 (WO) by virtue of the system-wide data that the ISPs' have on all mobile data users within its service coverage areas. The total population numbers for CR1, CR2 and CR3 would likely be provided by public and private sources such as the U.S. Consensus Bureau and third party demographic providers.

An examination of the population data within chart 1090 shows the following: CR2 contains the greatest number of system subscribers (1500) that have a geo-association with seller SMB3. This is not surprising given that CR2 is the "home" geo-position of the seller. CR3 is also shown as having the largest population (100,000) as well as the largest number of ad system users (18,000). Therefore, SMB3 must make a trade off in making its marketing decisions: advertise to a smaller group of system users where the advertising penetration is greater as a percentage of system users, or bid for advertising placement in areas (e.g. CR3) in which the sellers advertising penetration is smaller on a population percentage basis. All sellers would benefit greatly from such information, and the system of the present invention may be configured to make this readily available to participating sellers.

Figure 12:
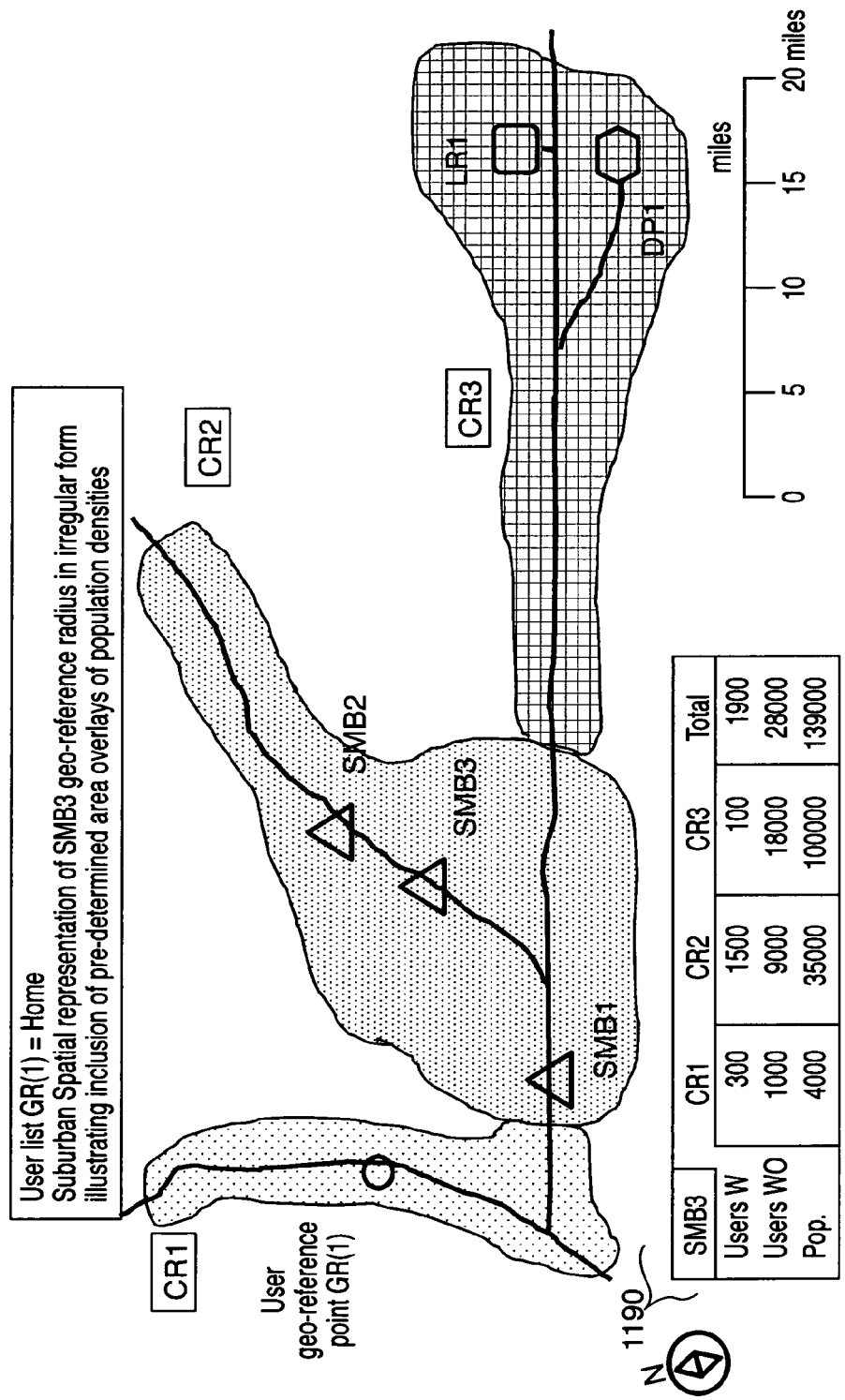
FIG. 12 another geographic depiction of the operation of the present invention according to another preferred embodiment.

It should be appreciated that other indicia may be included in connection with the data provided within chart 1090, even if the accompanying data is not subject to easy collection by the ISPs within the system of the present invention. Foot traffic or vehicular traffic may be additional criteria that influences the marketing decision-making of SMB3. If the majority of the population of CR3 is pedestrian and their geo-associations are geographically tight as between the buyers' geo-locations and the sellers' geo-locations, then SMB3 may find that advertising within CR3 provides little cross-border shopping migration. These overall statistics would be easily determined by the ISPs and made available to the sellers to assist with their marketing (most likely provided at additional cost as well). Geographic maps such as those provided in FIGS. 11 and 12 might also be made available to sellers for such purposes. Using the density of the cross hatching as an indicia of density, the differences between the FIGS. is apparent. In FIG. 11 the geographic mapped density reflects marketing penetration, which reveals that SMB3 has the greatest geo-association penetration in CR2 (its "home area") and the next greatest penetration in CR1—a rural adjacent area. In FIG. 12 where the marketing data 1190 is identical, the hatch density reflects inverse marketing penetration. FIG. 12 reveals that SMB3 has the greatest potential market penetration (all other factors being disregarded) in CR3 and the least marketing potential in CR1 where it has the greatest marketing penetration as a percentage of the total population.

Figure 14:
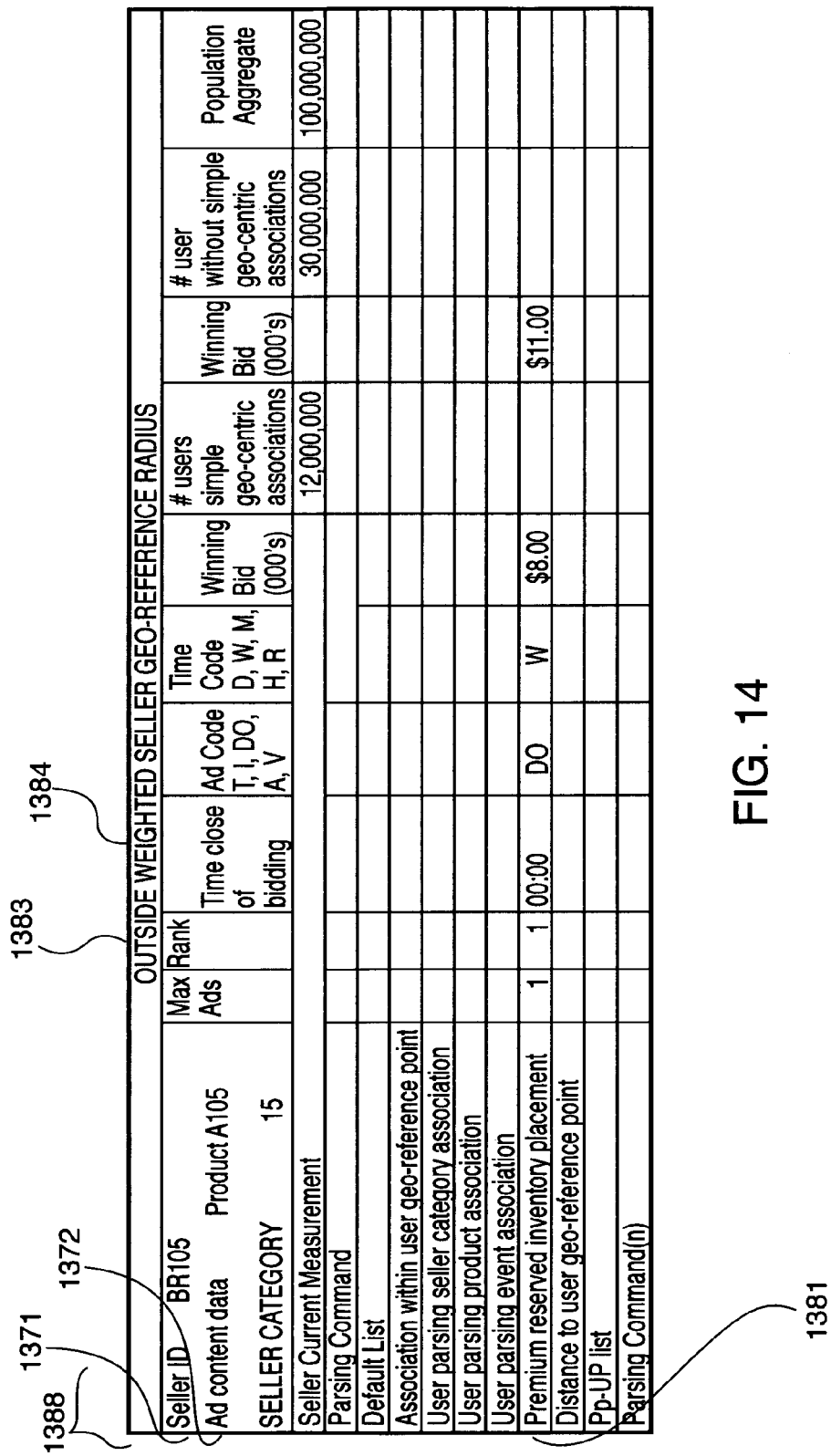
FIG. 14 shows another data diagram illustrating data elements used by the seller bidding panel according to another particularly preferred embodiment of the invention.
Figure 15:
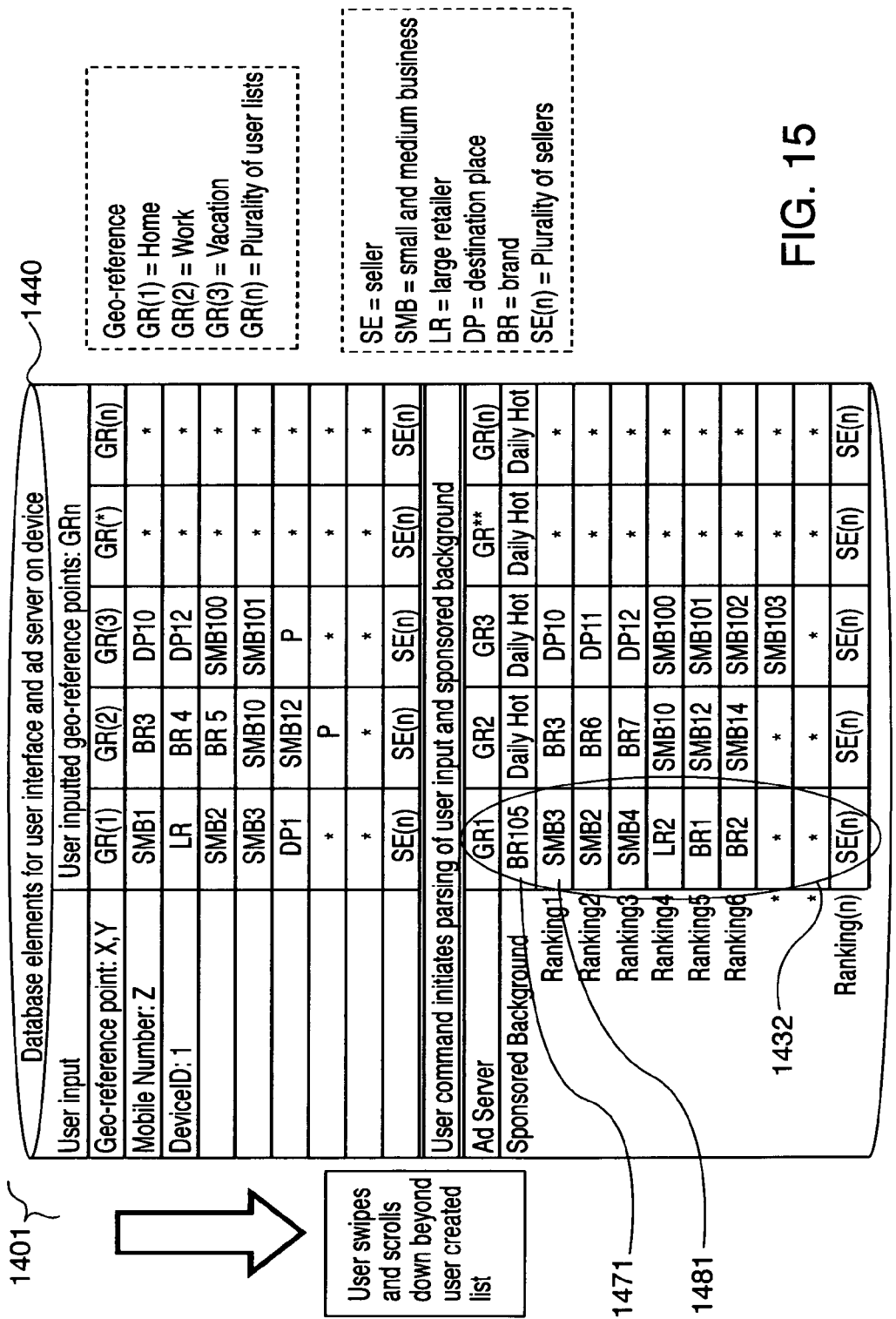
FIG. 15 shows a data diagram illustrating data elements used by the user's mobile devices in connection with the data contained in FIGS. 13 and 14 and according to one particularly preferred embodiment of the invention.

FIGS. 13-14 provide a working example of the bidding panels 1288 used by sellers 70 to make advertisement placement bids, particularly in the context of placing ads for brands and products specified by the user interface. FIG. 15 shows the resultant advertising data that is presented within the sponsored background section managed by the mobile device ad server 124 of FIG. 2. FIGS. 16-20 then proceed to show the corresponding mobile device displays that are created as the bidding process is executed.

FIG. 13 shows a bidding panel 1288 within which a seller may make bids for ad placement. As shown in FIG. 3, the bidding panel is part of the seller dashboard 80. The seller id (or geocode) is shown as SMB3 at 1271. The product on which the bidding is being conducted is shown as ad content data element "Product 1C." The product identification (1C) is a designation provided by the seller SMB3 and is unique to that seller. Other sellers of the same or similar products may have different designations.

Current bids being conducted by the seller are shown as rows and identified by their appropriate bid label. There are two running bids shown in bidding panel 1288: a bid for listing SMB3 and product 1C on the default list 1281 and a bid for listing SMB3 and product 1C in a user parsing (search) list 1285. As mentioned above, the mobile device user may select default criteria for his or her user preferences absent specific identification of sellers, destinations, products, and brands. The bid for the search pertains to the displayed results when a mobile device user conducts a mobile search, for example, for a product that is in their preferred list. The winner of the bid gets the ad placement at the top of the respective bid lists.

Provided within the bidding panel fields, shown at the across the top of the bidding panel 1288 are the maximum number of ads being taken for the bid and display 1282, the bidders rank with respect to the running bid 1283, and the bid time remaining 1284. In addition, the number of geo-centric associations with the bid product is provided 1286, the bid price (per thousand advertisements) 1287, the number of users without geo-centric associations 1284 and the total targetable population 1289 (assuming everyone had a mobile device and is present on the system). The bidding seller places his bid in the bid field 1287—shown as $12.00 per thousand for the default list. SMB3 is shown in column 1283 as the first ranked bidder with this bid and is likely to get the top of the four open spots 1282 if bidding closes without a higher bid placed by another seller. If SMB3 wins the bid for the default list for product 1C then he will pay $336 dollars ($12×28(000)) active users. Note that the bid is per thousand potential users, even though not every buyer has product 1C as a preference. The winning bidder pays to have the ad placed with all system users even though a much likely smaller percentage of those users (1900) shown at 1286 have the higher probability of reacting to the ad placement since they are actively looking to purchase the product. In the end, the winner is bidding for all the devices within the georadius (28,000) as determined by the database manager. Ad codes 1274 pertaining to the type of ad placement to be made (A-audio, V-visual, T-textual) are also shown in the bidding panel 1288 along with a time code 1273 indicating a duration of the ad placement. These factors are also necessarily considered by sellers when placing their bids in 1287.

FIG. 14 illustrates another bidding panel 1388 with a premium reserved inventory placement bid 1381 being conducted by BR105 (a brand name) for product A105.

Premium reserved inventory placement would conceivably pertain to big box retail establishments such as a Home Depot or a Sears. From the bidding panel, it is clear that the bidding is over 1384, BR105 has won the bid 1383 and that the winning bid for the 12 million geo-centric users is $8—making the ad payment due for this portion $96,000. Further, BR105 also had the winning bid for regional ad distribution with a winning bid of $11 for 30 million placements—making the ad payment due for this portion $330,000.

FIG. 15 shows a more complete version of the data stored within the buyer's mobile device 22 in which the user designated sponsored ad button is "ON" and as compared to data diagram 101 of FIG. 2. As provided in data diagram 1401 which contains the same data entered by the user of FIG. 2, the results of the bidding process illustrated in FIGS. 13 and 14 are displayed. Assuming that the user 22 was interested in geo-location GR(1) 1432 when the bidding took place, then the result of the bidding from SMB3 FIG. 13 is shown at 1481 as having SMB3 ranked #1 for ad placement. Since SM3 is on the buyers preferred list, the buyer receives ads from SMB3 anyway as a result of user selection. It is only through the bidding process that SMB3 is ranked at the top of the displayed list of retailers within GR(1) when in response to a particular search for goods using the user interface. The products and goods actually displayed to the user through the user interface 1530 of FIG. 16, including the product 1C, are provided in the displays shown in FIGS. 16-20. The data ranking is the same for the bid won by BR105 illustrated in FIG. 14. Since BR105 won the bid for premium reserve inventory placement, then BR105 shows up at the premium ad placement location within the database 1401 at 1471 since the seller SMB3 is at least one SMB that offers the product. As stated above, the ad server 24 on the buyer's mobile device filters, coordinates and prepares the database entries within local database 1440 for visual presentation via the user interface 1530 of FIG. 16.

Figure 16:
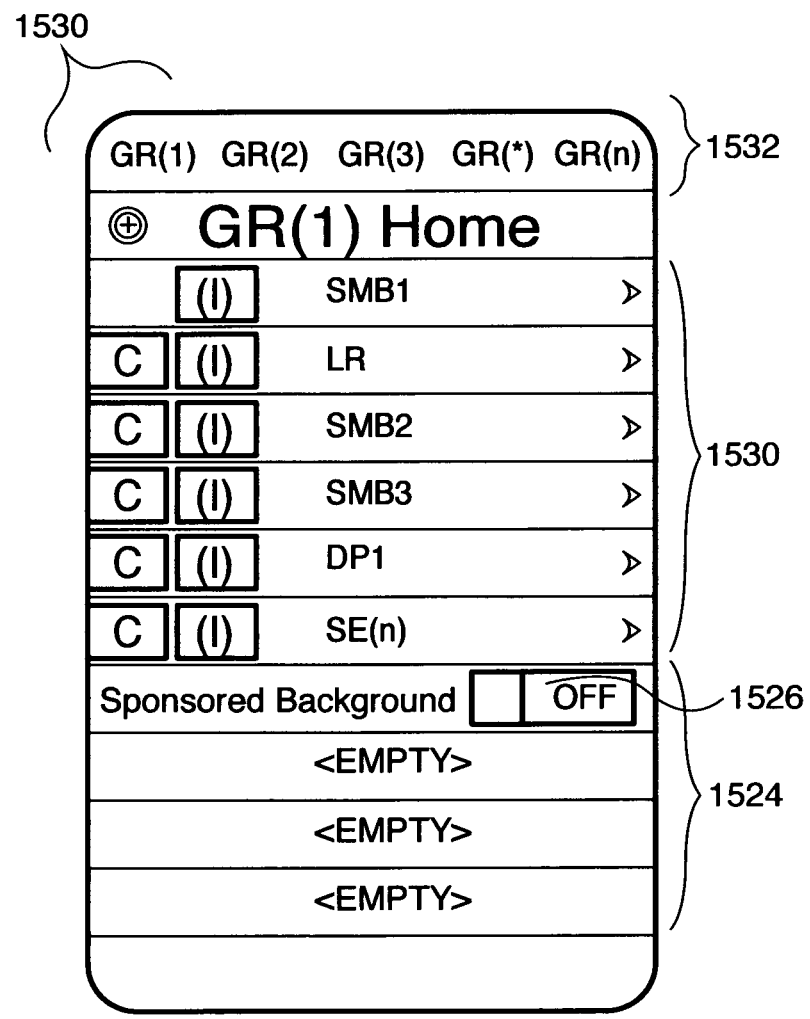
FIG. 16 shows a mobile device display according to one particularly preferred embodiment of the invention.

FIG. 16 provides a view of the user interface 1530 presented to the buyer on the user interface on the mobile device. The user-selected geo-references GR(1)-GR(n) are shown and displayed in a top portion 1532 called the geo-reference selection bar. Using the touch-screen capabilities of the mobile device, a desired geo-reference within the buyer's list may be presented in full (sections 1530 and 1524), in the display below the geo-reference selection bar. In the example of FIG. 16, GR(1)—HOME has been selected for display. User input data 134 of FIG. 2, such as user preferences for sellers, products and locations, is shown within display section 1530. With the sponsored background slider button 1526 set to the off position, the ad server does not manage the presentation of any sponsored (bid on) advertisements. Therefore, this display area 1524 is displayed as empty and is not functionally relevant to the operation of the mobile device as described in connection with FIGS. 1-12.

FIGS. 17A and 17B provide two views of the mobile device user interface with the sponsored background button 1626 set to on. As presented in data diagram 1401 of FIG. 15, the lower portions of the device display 1624 in FIGS. 17A and 17B are populated with the results of the bidding processes including the presentation of SMB3 as the winning bidder at the top of the lower display section. Further, BR105, the winning bidder in the premium reserved inventory placement is shown as the winner within a constant ad display 1671 within bar 1635 at the bottom of the user interface. Relative display portions of user input data display area 1630 and ad managed display portion 1624 may be changed by using the touch screen capabilities of the user interface to scroll up and down as shown by the direction of arrow 1603.

FIGS. 18A and 18B are an expanded view of the SMB3 listing shown in FIGS. 16 and 17. The SMB3 logo, unique geocode identifier and daily information are shown in a display bar 1735 provided immediately below the geo-reference selection bar 1732, The various products offered for sale, including product 1C 1781 are listed in the product display area along with the time codes related to the duration of the special product offerings (W=week; D-day; M=month). By using the touch screen functionality of the user interface, any one of the products or seller's events may be selected and displayed in detail as shown in FIG. 18B.

Figures 19A, 19B, 19C:
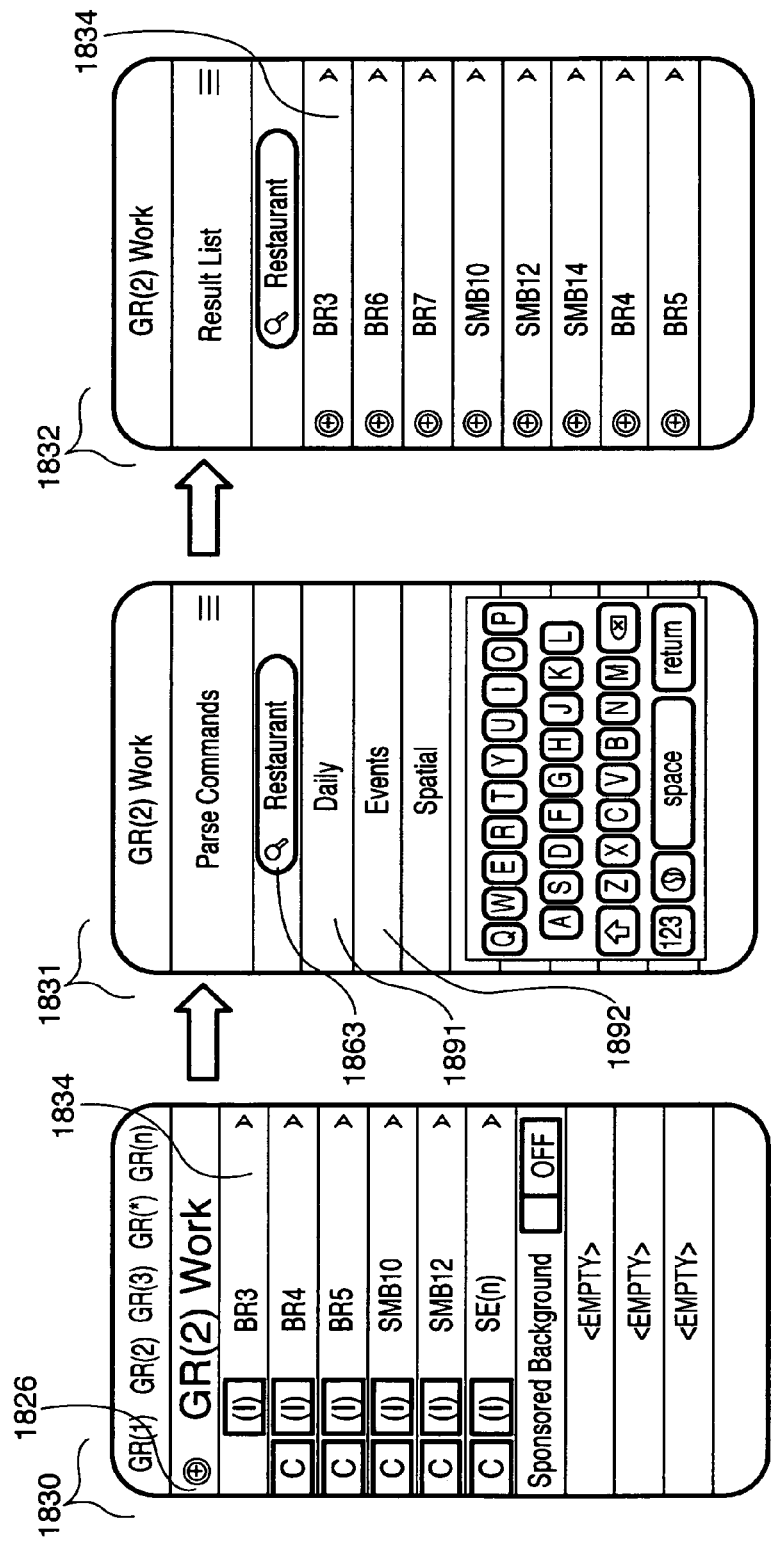
FIGS. 19A-19C show a series of mobile device displays illustrating a sequence of consecutive actions taken by the user according to one particularly preferred embodiment of the invention.

FIGS. 19A-19C display a sequence of user interface displays 1830-1832 that show the progression of steps that a buyer may employ while searching for products on a mobile device to arrive at a desired set of results. Referring to FIG. 19A, the buyer is shown to be displaying the user identified geo-reference GR(2)—WORK. By selecting the Parse Commands function (circle 1826) next to the present geo-reference indicator, the second user interface display 1831 is provided. Within FIG. 19B, various default selections are displayed such as daily promotions 1891 and promotional events 1892. By selecting one of these boxes, the buyer is presented with a full list of those items including related items that the user has received as a result of the user specified inputs. In the example of FIG. 19B, however, the buyer is presented with a textual search box 1863 into which a search term such as "restaurant" may be typed. Since the context in which the search was executed was with respect to geo-reference GR(2) WORK, the user device software and the ad server use this geo-reference, in combination with the buyer-input listing of restaurants of interest within GR(2), to condition and filter the search results from the local database, which are provided in FIG. 19C. It is seen from the results list there, that BR3 1834 which is on the user-input list of restaurants is returned as a search result along with some restaurants that are not within the buyer's preselected list. These non-geo-referenced restaurants may be populated and ranked by restaurants within a certain distance of GR(2) using the same bidding processes as those described in connection with FIGS. 13-15.

Figures 20A, 20B, 20C:
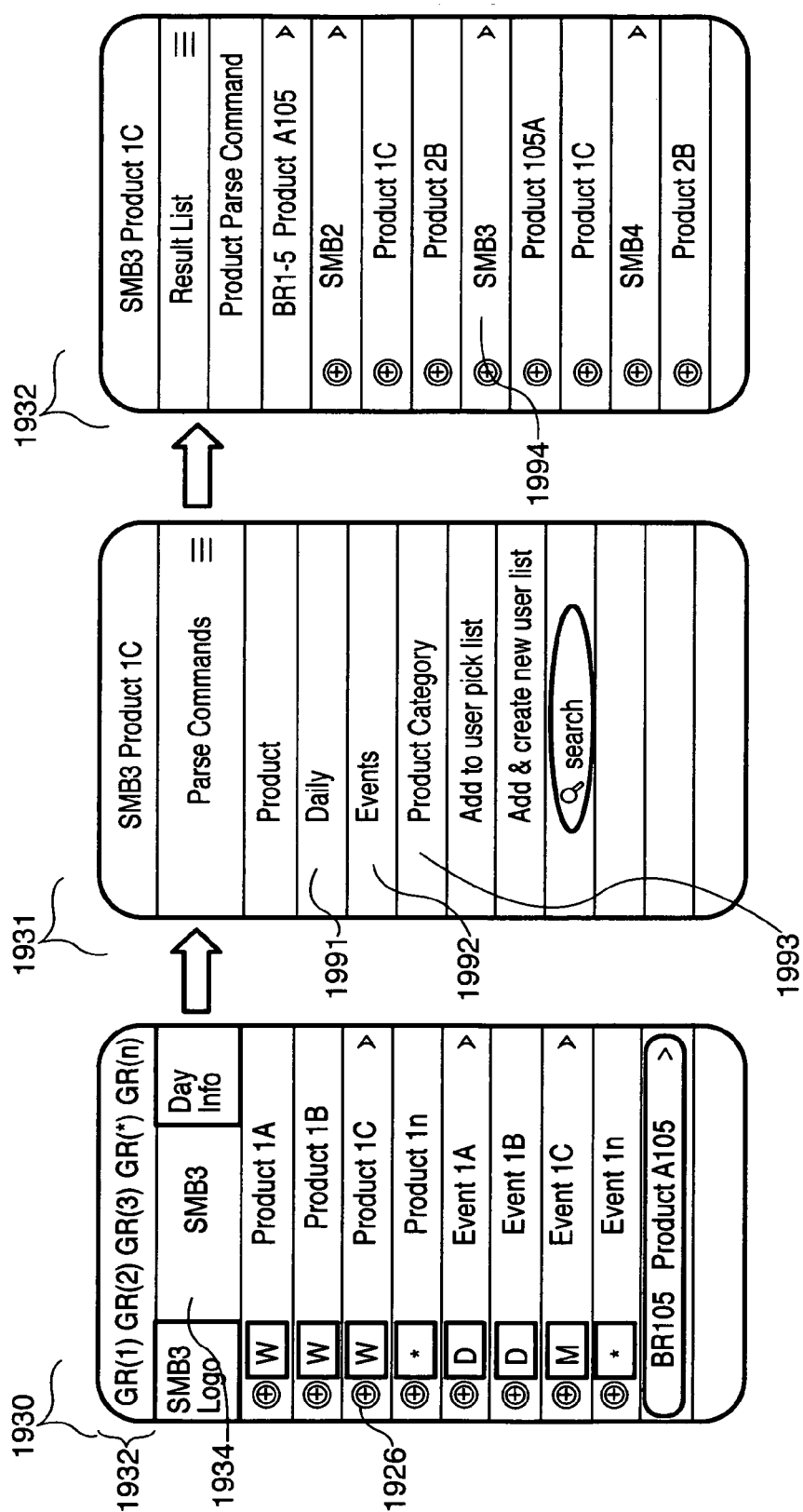
FIGS. 20A-20C shows another series of mobile device displays illustrating a sequence of consecutive actions taken by the user according to one particularly preferred embodiment of the invention.

FIGS. 20A-20C provide a similar sequence of search displays and search result displays but with respect to a particular product of interest. Referring to FIG. 20A, the buyer is shown to be displaying the user-input seller SMB3 1934 beneath the geo-reference bar 1932. By selecting the Parse Commands function (circle 1926) next to the product 1C, the second user interface display 1931 is provided. Within FIG. 20B, various default selections are displayed such as daily promotions 1991 and promotional events 1992. By selecting one of these boxes, the buyer is presented with a full list of those items including related items that the user has received as a result of the user specified inputs. In the example of FIG. 20B, however, the buyer is presented with a product category command 1993 associated with product 1C. Since the context in which the search was executed was with respect to user-input SMB3, the user device software and the ad server use this data in combination with the other buyer-input listing of sellers of interest to condition and filter the product search results, which are provided in FIG. 20C. It is seen from the results list there, that SMB3 1994 which is on the user-input list of sellers is returned as a search result identifying it as a seller of product 1C along with a list of other sellers that are not within the buyer's preselected list. These non-product-referenced sellers may be populated by sellers that are within a certain distance of the geo-position of the GR(1) using the same bidding processes as described in connection with FIGS. 13-15.

It is precisely the situation in which the user has direct control to input a plurality of targeted sellers, specify parsing commands and geographic areas of interest, that enables the ad server on the user mobile device to deliver ads and offerings relevant to the user at precisely the moment in time the user is most engaged with shopping planning and decisions, the most efficient time to plant a seed for a brand or product. The present invention provides the user direct control over this data push function and the filtering of the returned results enabled by the pull dynamic and enables an innovative ad connectivity system to help build channel relationships between the user and seller. Intuitively the system and method embodies and enables user loyalty with seller and ongoing engagement at a high level of interest for user. The user best knows the user intentions, motives and schedule. It only takes a mobile minute for a user to get a highly relevant view of specials, notices and promotions from their targeted sellers whether it is a shoe repair shop next door or a national food service chain 10 minutes away. The user's push-pull dynamic of the present invention enables the user to get the ads the user wants, when they want it, without sacrificing privacy. Further, significant time savings are afforded the user by optimizing the user's time to plan his or her shopping and taking the time, when scheduled, to compare price and value from various sellers. The user interface of the present invention would efficiently be integrated within the user process for shopping during the day, week, month, or holiday because it is primarily user driven.

The tracking and centralized methodologies of mobile advertising networks which have adapted the tracking cookie methodology from the online internet do not effectively deliver relevant ads and information to the user and in an efficient manner for user data consumption, user data costs, and mobile device battery life. Further the tracking and centralized methodologies of mobile advertising networks have an extremely high privacy cost to the mobile device user in exchange for advertisements and user service value that deliver low quality benefits acutely with local advertising to both mobile device users and for businesses seeking relevant advertising and relationships with mobile device users.

For many small and medium businesses (SMBs) seeking access to mobile advertising, building a mobile-optimized website is a starting point, but they often lack a viable search engine mobile strategy on a cost efficient basis. Search is recognized as the primary method that a user finds a seller on mobile. Further many SMBs need an on-going, non-obtrusive channel with the user to present offers, reminders, and coupons and maintain user loyalty: Many large brands and large retailers have financial and human resources to access current media advertising networks and techniques. However the value of localization to the user requires that all sellers be able to access the channel with user. Local sellers deliver convenience to the user with the seller being nearby and the attribute of having purchases come home or delivered. Local sellers are an integral part of the community or neighborhood where the seller can leverage face-to-face interaction and provide assistance. The seller traditionally places notices, specials, and advertisements on the frontage of their physical store location(s) to capture attention and draw foot traffic into their physical location from the existing and daily foot and vehicle traffic outside and nearby their physical store location(s). Therefore for local advertising to have a meaningful value to a user, all sellers small and big need to access mobile advertising and access the channel with the user.

This invention is adaptable by all SMBs, large retailers, nationwide brand names, and mobile destination places to place ads and run mobile ad campaigns within any budget and on any scale. The system and methodology is adaptable to geo-centric campaigns as small as one urban block, neighborhood and scalable to entire urban city, state and regional geography, nationwide, and globally. The invention provides a comprehensive solution to provide local advertising and larger scale advertising campaigns.

While the invention has been shown and described with reference to specific preferred embodiments, it should be understood by those skilled in the art that various changes in form and detail may be made therein without departing from the spirit and scope of the invention as defined by the following claims.

What is claimed is:

1. A computer-based notification system for delivering notifications from sellers within said notification system to buyers within said notification system, said computer-based notification system including a computer-based mobile network, said computer-based notification system comprising:

at least one computer-based mobile device employed by a buyer within said notification system, said buyer mobile device coupled to said computer-based mobile network, said mobile device having an ad server including a processor and an associated memory for storing instructions executed by said processor, said mobile device including a local database, said buyer activating a user interface on said buyer mobile device to store buyer profile data elements in said local database, said buyer profile data elements including buyer-specified advertising content, including at least one of a seller, a product or a service, said buyer profile data elements also including a buyer-specified geographic area, said buyer profile data elements comprising offerings preferred by said buyer;

at least one computer-based sales promotion device coupled to said computer-based mobile network, said sales promotion device having a processor and an associated memory for storing instructions executed by said processor, said sales promotion device used by a seller to input product or service data elements, and a seller's geographic location, said seller's data elements entered into said associated memory of said sales promotion device and comprising a seller's offering, said processor of said sales promotion device transmitting said seller's offering to said computer-based mobile network, at least one server and database manager within said computer-based mobile network receiving and storing said seller's offerings in a local database within said computer-based mobile network; and wherein said computer-based mobile network includes a location determining network coupled to said mobile network, said location determining network providing said mobile device with a physical geographic location, said ad server on said computer-based mobile device transmitting a request for seller's offerings to said mobile network based on said determined physical geographic location and said buyer-specified geographic area, said mobile network returning a list of seller's offerings based on said transmitted request, said ad server matching said returned seller's offerings to said buyer's preferred offerings and displaying said matched returned seller's offerings on said user interface on said mobile device.

2. The computer-based notification system of claim 1 wherein said ad server on said computer-based mobile device also transmits said preferred offerings in its request for seller's offerings to said mobile network, said database manager within said mobile network pre-filtering said list of seller's offerings and returning said list of seller's offerings based on said determined location and said buyer preferred offerings.

3. The computer-based notification system of claim 1 wherein said buyer profile data elements include a product data element, said seller data element includes a product identifier, said ad server further determining a match within said returned seller's offerings using said product data and said product identifier.

4. The computer-based notification system of claim 2 wherein said seller's product or service data elements further include one of an advertisement, a circular, a promotion, an event, a destination place, or a brand.

5. The computer-based notification system of claim 1 further comprising:
a computer-based physical location device located at a geographic location, said computer-based physical location device coupled to said mobile network and coupled to said sales promotion device, said physical location device having a wireless transmitter for transmitting a seller's unique physical location identifier indicating said seller's geographic location, said physical location device transmitting said unique physical location identifier to said user when said at least one mobile device is in range of said physical location device, said user activating said user interface on said user mobile device to store said unique physical location identifier as one of said user geographic area user profile data elements in said local database, said preferred offerings of said user being updated by said ad server to include said seller associated with said physical location device.

6. The computer-based notification system of claim 1 wherein said product or service data elements include an expiration period data element, said returned list of seller's offerings including said expiration period data element, said returned list of seller's offerings containing said expiration period data element expiring on said date of said data expiration element.

7. The computer-based notification system of claim 1 wherein said product or service data elements are periodically updated by said seller by entering new product or service data elements using said sales promotion device.

8. The computer-based notification system of claim 1 wherein said computer-based mobile device is a handheld mobile device, said handheld mobile device being one of a handheld electronic device, a tablet, a smartphone, a mobile phone, a phablet, a laptop, or a notebook computer.

9. The computer-based notification system of claim 1 wherein said buyer-specified geographic area data is a geocode, said geocode including one of said buyer's home location, said buyer's employment location, and a physical geographic location not frequently visited by said buyer.

10. The computer-based notification system of claim 1 further comprising:
a bidding panel within said sales promotion device, said seller making placement bids using said bidding panel to create sponsored product or service data elements, said sponsored product and service data elements being included within said seller's offering;
a sponsored offerings data field within said user interface of said buyer's mobile device, said buyer selecting said sponsored offerings data field, said sponsored offerings products and services being part of said buyer's preferred offerings, said transmitted request for seller's offerings including said seller's sponsored offering product or service, said transmitted request for seller's offerings returning said sponsored product or service as part of said seller's offerings, said ad server displaying said sponsored offerings data along with said matched returned seller's offerings.

11. A computer-implemented method for delivering notifications from sellers to buyers within a computer-based notification system, said computer-based notification system including a computer-based mobile network, said computer based mobile network coupled to a computer-based mobile device and a computer-based sales promotion device, each computer-based device, server and system having a processor and an associated memory for storing instructions executed by said processors, said method comprising:
activating a user interface on said mobile device by a buyer;
storing buyer profile data elements in a local database on said mobile device by said buyer using said user interface, said buyer profile data elements also stored using a local ad server on said mobile device coupled to said local database, said buyer profile data elements including buyer-specified advertising content, including at least one of a seller, a product or a service, said buyer profile data elements also including a buyer-specified geographic area, said buyer profile data elements comprising offerings preferred by said buyer;
inputting product or service data elements by a seller into said associated memory of said sales promotion device, said product or service data elements including a seller's geographic location, said seller's data elements and said seller's geographic location data comprising a seller's offering;
transmitting said seller's offering with said processor of said sales promotion device to said computer-based mobile network;
receiving and storing said seller's offerings in a local database within said computer-based mobile network: said receiving and storing being performed using at least one server and a database manager within said computer-based mobile network;
providing said mobile device with a physical geographic location, said physical geographic location determined by a location determining network coupled to said mobile network;
transmitting a request for seller's offerings from said ad server on said computer-based mobile device to said mobile network based on said determined location:
returning a list of seller's offerings from said server and said database manager within said mobile network based on said determined location and said buyer-specified geographic location;
matching with said ad server said returned seller's offerings to said buyer's preferred offerings; and
displaying said matched returned seller's offerings on said user interface on said mobile device.

12. The computer-implemented method of claim 11 further comprising periodically repetitively:
entering new product or service data elements using said sales promotion device by said seller; and
updating said service offerings on said mobile network by transmitting said new product or service data elements with said processor of said sales promotion device to said local database on said computer-based mobile network.

13. The computer-implemented method of claim 11 wherein said step of transmitting seller's offerings further comprises:
   transmitting said offerings preferred by said buyer in its request for seller's offerings to said mobile network;
   filtering with said database manager within said mobile network said list of seller's offerings and
   returning said pre-filtered list of seller's offerings based on said determined location and said offerings preferred by said buyer.

14. The computer-implemented method of claim 11 wherein said seller's offering includes an expiration period data element, the method further comprising:
   removing said seller's offering from said local database when said expiration period of said expiration data element is reached.

15. The computer-implemented method of claim 11 wherein said step of transmitting said seller's offering with said processor of said sales promotion device to said computer-based mobile network is scheduled for a certain time, and said step occurs at that certain time.

16. The computer-implemented method of claim 11 further comprising:
   creating a placement bid for a sponsored product or service by said seller using a bidding panel within said sales promotion device, said placement bid creating sponsored product or service data elements,
   including said sponsored product or service data elements within said seller's offering;
   activating a sponsored offerings data field within said user interface of said buyer's mobile device,
   including said sponsored offerings within said buyer's preferred offerings; and
   displaying said sponsored product or service data elements on said user interface on said mobile device with said matched returned seller's offerings.

17. One or more non-transitory machine-readable storage media having executable instructions for causing a plurality of processors within a plurality of computers to perform method for delivering notifications from sellers to buyers within a computer-based notification system, said computer-based notification system including a computer-based mobile network, said computer based mobile network coupled to a computer-based mobile device and a computer-based sales promotion device, each computer-based device, server and system having a processor and an associated memory for storing instructions executed by said processors, said method comprising:
   activating a user interface on said mobile device by a buyer;
   storing buyer profile data elements in a local database on said mobile device by said buyer using said user interface, said buyer profile data elements also stored using a local ad server on said mobile device coupled to said local database, said buyer profile data elements including buyer-specified advertising content, including at least one of a seller, a product or a service, said buyer profile data elements also including a buyer-specified geographic area, said buyer profile data elements comprising offerings preferred by said buyer;
   inputting product or service data elements by a seller into said associated memory of said sales promotion device, said product or service data elements including a seller's geographic location, said seller's data elements and said seller's geographic location data comprising a seller's offering;
   transmitting said seller's offering with said processor of said sales promotion device to said computer-based mobile network;
   receiving and storing said seller's offerings in a local database within said computer-based mobile network; said receiving and storing being performed using at least one server and a database manager within said computer-based mobile network;
   providing said mobile device with a physical geographic location, said physical geographic location determined by a location determining network coupled to said mobile network;
   transmitting a request for seller's offerings from said ad server on said computer-based mobile device to said mobile network based on said determined location;
   returning a list of seller's offerings from said server and said database manager within said mobile network based on said determined location and said buyer-specified geographic location;
   matching with said ad server said returned seller's offerings to said buyer's preferred offerings; and
   displaying said matched returned seller's offerings on said user interface on said mobile device.

18. The non-transitory, machine-readable storage media of claim 17 having executable instructions for causing a plurality of processors within a plurality of computers to perform a method, said method comprising:
   creating a placement bid for a sponsored product or service by said seller using a bidding panel within said sales promotion device, said placement bid creating sponsored product or service data elements,
   including said sponsored product or service data elements within said seller's offering;
   activating a sponsored offerings data field within said user interface of said buyer's mobile device,
   including said sponsored offerings within said buyer's preferred offerings; and
   displaying said sponsored product or service data elements on said user interface on said mobile device with said matched returned seller's offerings.

* * * * *